(12) United States Patent
Mizuno

(10) Patent No.: US 9,731,784 B2
(45) Date of Patent: Aug. 15, 2017

(54) WHEELCHAIR ELECTRIC DEVICE, ELECTRIC WHEELCHAIR WITH WHEELCHAIR ELECTRIC DEVICE AND DRIVE MONITORING METHOD FOR ELECTRIC WHEELCHAIR

(71) Applicant: YAMAHA HATSUDOKI KABUSHIKI KAISHA, Shizuoka (JP)

(72) Inventor: Masamitsu Mizuno, Shizuoka (JP)

(73) Assignee: YAMAHA HATSUDOKI KABUSHIKI KAISHA, Shizuoka-ken (JP)

( * ) Notice: Subject to any disclaimer, the term of this patent is extended or adjusted under 35 U.S.C. 154(b) by 53 days.

(21) Appl. No.: 14/897,102

(22) PCT Filed: Jul. 4, 2013

(86) PCT No.: PCT/JP2013/068348
§ 371 (c)(1),
(2) Date: Dec. 9, 2015

(87) PCT Pub. No.: WO2015/001640
PCT Pub. Date: Jan. 8, 2015

(65) Prior Publication Data
US 2016/0121956 A1 May 5, 2016

(51) Int. Cl.
*A61G 5/02* (2006.01)
*B62K 5/007* (2013.01)
(Continued)

(52) U.S. Cl.
CPC .............. *B62K 5/007* (2013.01); *A61G 5/041* (2013.01); *A61G 5/045* (2013.01); *A61G 5/1054* (2016.11);
(Continued)

(58) Field of Classification Search
CPC .... B60L 15/20; B60L 3/0023; B60L 15/2036; B62D 51/001; A61G 5/041; A61G 5/06; A61G 5/048; B62K 5/007; B60G 2300/24
(Continued)

(56) References Cited

U.S. PATENT DOCUMENTS 5,304,912 A   4/1994   Kajiwara et al.
5,427,193 A   6/1995   Avakian
(Continued)

FOREIGN PATENT DOCUMENTS

EP   2368746 A2   9/2011
JP   S60-73301 U   5/1985
(Continued)

OTHER PUBLICATIONS

An Office Action; "Notice of Reasons for Rejection" issued by the Japanese Patent Office on Jun. 14, 2016, which corresponds to Japanese Patent Application No. 2015-524970 and is related to U.S. Appl. No. 14/897,102.
(Continued)

*Primary Examiner* — Dalena Tran
(74) *Attorney, Agent, or Firm* — Studebaker & Brackett PC

(57) ABSTRACT

It becomes possible to monitor a driven state of each wheel in a wheelchair whose wheels are driven according to output information calculated based on input information. A left wheel controller and a right wheel controller are provided. The presence or absence of a drive abnormality of the left wheel is determined by the right wheel controller receiving first drive related information that is related to a drive of the left wheel and transmitted from the left wheel controller, and the presence or absence of a drive abnormality of the left wheel is determined by the left wheel controller receiving second drive related information that is related to a drive of
(Continued)

the right wheel and transmitted from the right wheel controller.

11 Claims, 11 Drawing Sheets

(51) Int. Cl.
    *A61G 5/04*     (2013.01)
    *B60L 3/00*     (2006.01)
    *A61G 5/10*     (2006.01)

(52) U.S. Cl.
    CPC ......... *B60L 3/0023* (2013.01); *Y02T 10/7258* (2013.01)

(58) Field of Classification Search
    USPC ............................................ 701/22; 180/907
    See application file for complete search history.

(56) References Cited

U.S. PATENT DOCUMENTS

| | | | |
|---|---|---|---|
| 5,818,189 A | 10/1998 | Uchiyama et al. | |
| 5,860,487 A * | 1/1999 | Tanaka | B62M 6/60 180/206.2 |
| 6,354,390 B1 * | 3/2002 | Uchiyama | A61G 5/045 180/6.5 |
| 2011/0232977 A1 | 9/2011 | Trowell et al. | |
| 2014/0180520 A1 | 6/2014 | Kume et al. | |

FOREIGN PATENT DOCUMENTS

| | | |
|---|---|---|
| JP | H04-150701 A | 5/1992 |
| JP | H05-91601 A | 4/1993 |
| JP | H07-313555 A | 12/1995 |
| JP | H09-39877 A | 2/1997 |
| JP | H09-215713 A | 8/1997 |
| JP | 3204968 B2 | 9/2001 |
| JP | 2002-209954 A | 7/2002 |
| WO | 9505141 A1 | 2/1995 |
| WO | 2013-021546 A1 | 2/2013 |

OTHER PUBLICATIONS

The extended European search report issued by the European Patent Office on Jul. 11, 2016, which corresponds to European Patent Application No. 13888641.1-1651 and is related to U.S. Appl. No. 14/897,102.

International Search Report; issued in PCT/JP2013/068348; mailed Jul. 30, 2013.

Written Opinion; issued in PCT/JP2013/068348; mailed Jul. 30, 2013.

* cited by examiner

F I G. 10
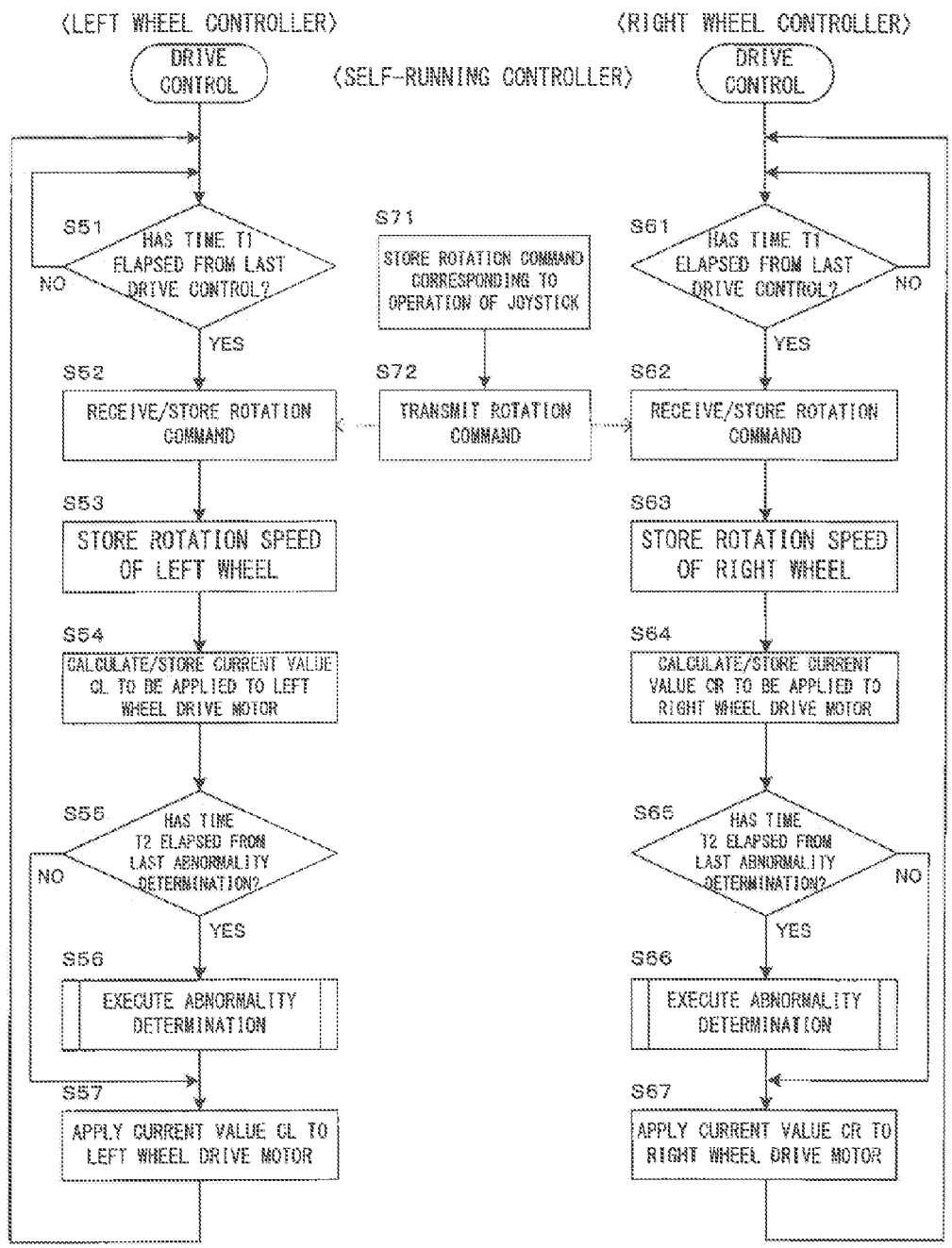

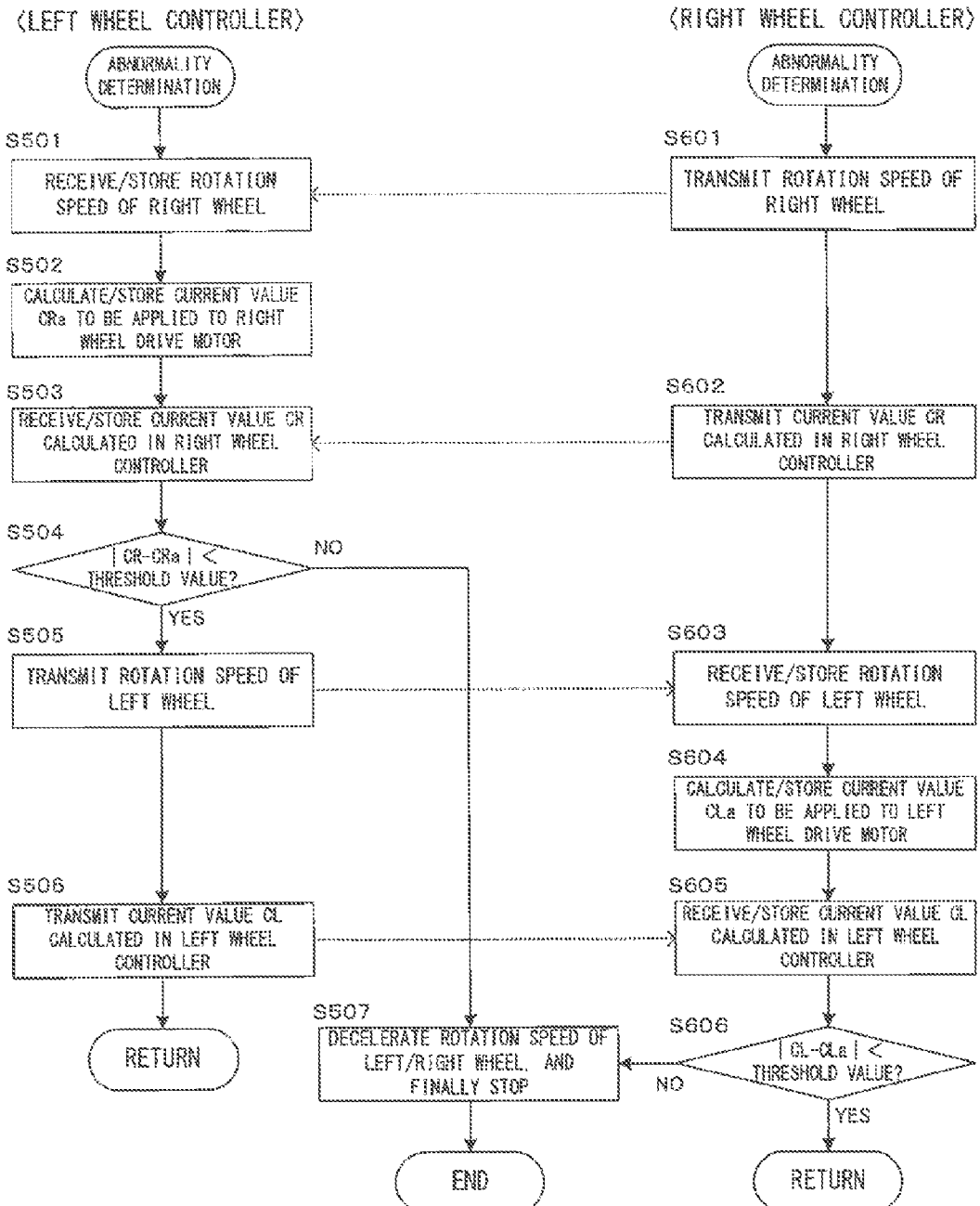

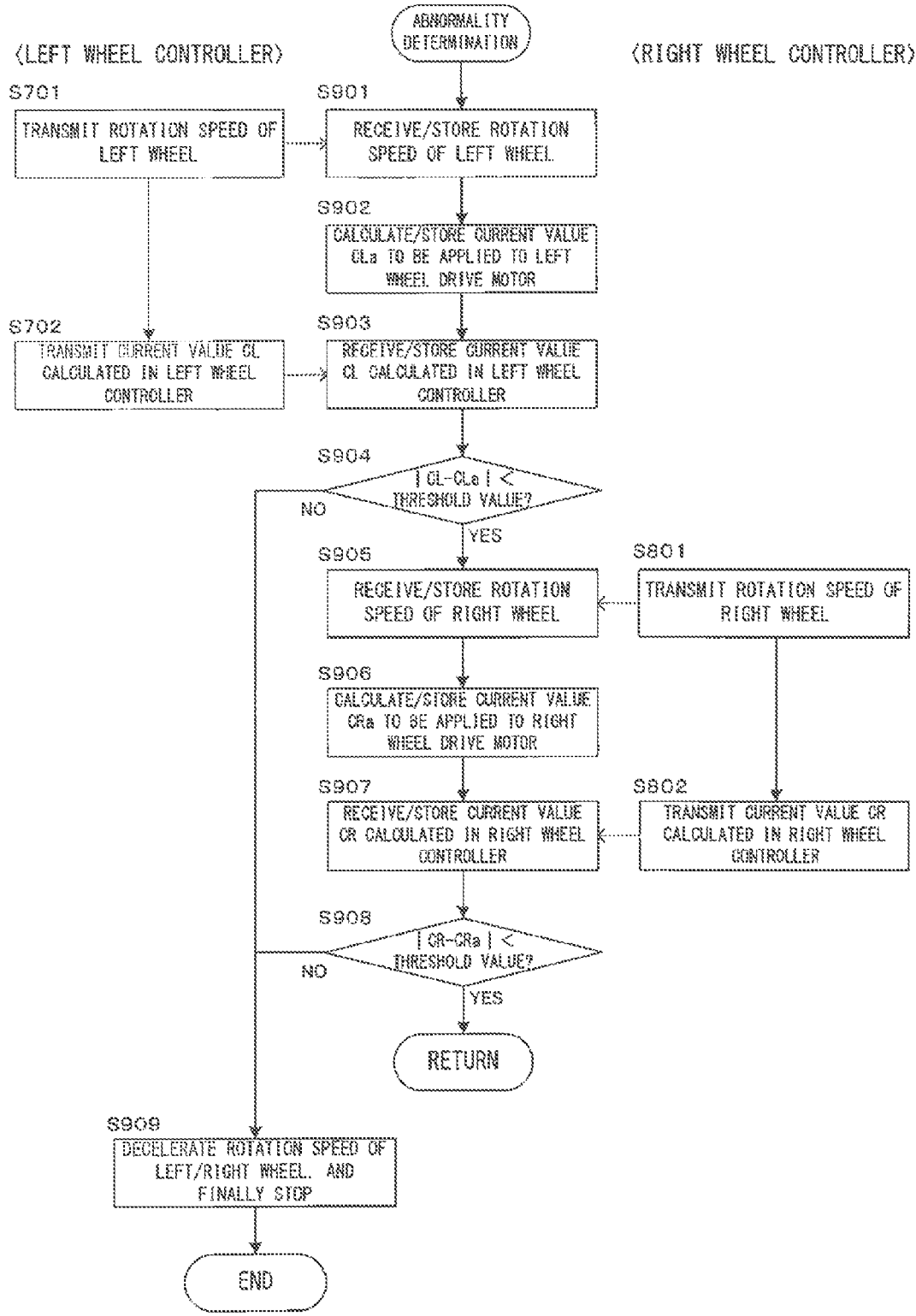

WHEELCHAIR ELECTRIC DEVICE, ELECTRIC WHEELCHAIR WITH WHEELCHAIR ELECTRIC DEVICE AND DRIVE MONITORING METHOD FOR ELECTRIC WHEELCHAIR

CROSS REFERENCE TO RELATED APPLICATIONS

This application claims benefit of priority to International Patent Application No. PCT/JP2013/068348 filed Jul. 4, 2013, the entire content of which is incorporated herein by reference.

TECHNICAL FIELD

The disclosure relates to a technology for operating a wheelchair by applying power corresponding to a rotation command given by a user of the wheelchair to wheels.

BACKGROUND

Conventionally, a wheelchair is known which drives wheels by applying power corresponding to a rotation command to the wheels when the rotation command is given by a user such as a passenger of the wheelchair or a caretaker. For example, in a wheelchair described in Japanese Patent Application No. JP09-215713A, a force applied to each of left and right wheels by a passenger is detected as an example of a rotation command by a user, auxiliary power is calculated based on this detection value by a controller and a current value corresponding to the auxiliary power is given to a drive motor for each wheel. Specifically, the controller calculates output information (e.g. current value to be applied to the drive motor here) for controlling the drive motor for the wheel based on input information (e.g. force applied to each wheel by the passenger and rotation speed of each wheel here) related to a drive control of the wheels, and each wheel is driven based on this output information.

SUMMARY

Technical Problem

However, there have been cases where the calculation of the output information based on the input information is not properly performed, for example, if the controller malfunctions in such a wheelchair. Then, the wheels are driven based on the improper output information. Alternatively, even if the output information is properly calculated, it may be difficult to properly drive the wheels if either one of the wheels is affected by an obstacle, unevenness or the like present on a road. Accordingly, it is desired to monitor a driven state of each wheel, but there has been no technology adapting to such a need.

This disclosure was developed in view of the above problem and aims to provide a technology capable of monitoring a driven state of each wheel in a wheelchair whose wheels are driven according to output information calculated based on input information.

Solution to Problem

A wheelchair electric device according to this disclosure causes a wheelchair to run by driving a first wheel by a first driving unit and driving a second wheel by a second driving unit, comprising: a first control unit to calculate first output information based on first input information related to a drive control of the first wheel and control the first driving unit by the first output information; a second control unit to calculate second output information based on second input information related to a drive control of the second wheel and control the second driving unit by the second output information; a first drive related information transmission unit to transmit at least part of the first input information and the first output information as first drive related information related to the drive of the first wheel; a second drive related information transmission unit to transmit at least part of the second input information and the second output information as second drive related information related to the drive of the second wheel; a first drive related information reception unit to receive the first drive related information transmitted from the first drive related information transmission unit; and a second drive related information reception unit to receive the second drive related information transmitted from the second drive related information transmission unit; wherein the presence or absence of a drive abnormality of the first wheel is determined based on the first drive related information received by the first drive related information reception unit and the presence or absence of a drive abnormality of the second wheel is determined based on the second drive related information received by the second drive related information reception unit.

An electric wheelchair according to this disclosure runs by driving the first wheel and the second wheel by the above wheelchair electric device.

A drive monitoring method according to this disclosure is a drive monitoring method for an electric wheelchair that runs by driving a first wheel by first output information calculated based on first input information related to a drive control of the first wheel and driving a second wheel by second output information calculated based on second input information related to a drive control of the second wheel, comprising: a step of transmitting at least part of the first input information and the first output information as first drive related information related to the drive of the first wheel; a step of transmitting at least part of the second input information and the second output information as second drive related information related to the drive of the second wheel; and a step of receiving the transmitted first drive related information and determining the presence or absence of a drive abnormality of the first wheel based on the first drive related information, and receiving the transmitted second drive related information and determining the presence or absence of a drive abnormality of the second wheel based on the second drive related information.

In the thus configured disclosure (wheelchair electric device, electric wheelchair comprising the wheelchair electric device and drive monitoring method for electric wheelchair), the first drive related information transmission unit and the first drive related information reception unit are provided. This first drive related information includes at least part of the first input information and the first output information and is transferred as information related to the drive of the first wheel between the above transmission unit and reception unit. Then, the presence or absence of the drive abnormality of the first wheel is determined based on the first drive related information. On the other hand, on the side of the second wheel as the side of the first wheel, the second drive related information transmission unit and the second drive related information reception unit are provided, at least part of the second input information and the second output information is transferred as a second drive related information related to the drive of the second wheel between the above transmission unit and reception unit. Then, the presence or absence of the drive abnormality of the second wheel is determined based on the second drive related information. As just described, in the disclosure, driven states of the first and second wheels are monitored.

In the wheelchair electric device according to this disclosure, it may be configured that the first control unit determines the presence or absence of the drive abnormality of the second wheel based on the second drive related information received by the second drive related information reception unit; and the second control unit determines the presence or absence of the drive abnormality of the first wheel based on the first drive related information received by the first drive related information reception unit. According to such a configuration, each of the first control unit and second control unit determines the presence or absence of the drive abnormality of the opposite wheel. Thus, it is not necessary to separately provide a control unit to determine the presence or absence of the drive abnormality of each wheel and the driven state of each wheel can be monitored by a simple device configuration.

It may be configured that the second drive related information transmission unit transmits the second input information and the second output information as the second drive related information; and the first control unit includes: a second output information estimation unit to estimate the second output information based on the second input information received by the second drive related information reception unit, and a second wheel abnormality determination unit to determine the presence or absence of the drive abnormality of the second wheel based on the second output information estimated by the second output information estimation unit and the second output information received by the second drive related information reception unit. According to such a configuration, the drive abnormality that possibly occurs in the second wheel when there is trouble, for example, in the calculation of the second output information can be detected by the first control unit.

Similarly, the first drive related information transmission unit transmits the first input information and the first output information as the first drive related information; and the second control unit includes: a first output information estimation unit to estimate the first output information based on the first input information received by the first drive related information reception unit, and a first wheel abnormality determination unit to determine the presence or absence of the drive abnormality of the first wheel based on the first output information estimated by the first output information estimation unit and the first output information received by the first drive related information reception unit. According to such a configuration, the drive abnormality that possibly occurs in the first wheel when there is trouble, for example, in the calculation of the first output information can be detected by the second control unit.

It may be configured that the second drive related information transmission unit transmits a rotation speed of the second wheel when the second wheel is driven by the second output information and the second input information as the second drive related information; and the first control unit includes: a second rotation speed estimation unit to calculate the second output information based on the second input information received by the second drive related information reception unit and estimate the rotation speed of the second wheel when the second wheel is driven by the calculated second output information, and a second wheel abnormality determination unit to determine the presence or absence of the drive abnormality of the second wheel based on the rotation speed of the second wheel estimated by the second rotation speed estimation unit and the rotation speed of the second wheel received by the second drive related information reception unit. According to such a configuration, an abnormality can be detected by the first control unit when the rotation speed of the second wheel does not reach a rotation speed corresponding to the second output information from the second control unit, for example, due to an obstacle, unevenness or the like present on a road and the drive abnormality has occurred in the second wheel.

Similarly, it may be configured that the first drive related information transmission unit transmits a rotation speed of the first wheel when the first wheel is driven by the first output information and the first input information as the first drive related information; and the second control unit includes: a first rotation speed estimation unit to calculate the first output information based on the first input information received by the first drive related information reception unit and estimate the rotation speed of the first wheel when the first wheel is driven by the calculated first output information, and a first wheel abnormality determination unit to determine the presence or absence of the drive abnormality of the first wheel based on the rotation speed of the first wheel estimated by the first rotation speed estimation unit and the rotation speed of the first wheel received by the first drive related information reception unit. According to such a configuration, an abnormality can be detected by the second control unit when the rotation speed of the first wheel does not reach a rotation speed corresponding to the first output information from the first control unit, for example, due to an obstacle, unevenness or the like present on a road and the drive abnormality has occurred in the first wheel.

It may be configured to comprise: an operation unit to receive a running command by a user; and a third control unit to control the running of the wheelchair by outputting a rotation command of the first wheel as the first input information and outputting a rotation command of the second wheel as the second input information based on a command given to the operation unit and; wherein the third control unit determines the presence or absence of the drive abnormality of the first wheel based on the first drive related information received by the first drive related information reception unit and determines the presence or absence of the drive abnormality of the second wheel based on the second drive related information received by the second drive related information reception unit. By determining the presence or absence of the drive abnormality of the first and second wheels by the third control unit separately provided besides the first and second control units in this way, the drive abnormality of each wheel can be more reliably detected even if both the first control unit and the second control unit malfunction.

It may be configured that the drive control of the first wheel by the first control unit and the drive control of the second wheel by the second control unit are executed in the same control cycle, whereas the transmission and reception of the first drive related information, the determination of the presence or absence of the drive abnormality of the first wheel based on the first drive related information, the transmission and reception of the second drive related information and the determination of the presence or absence of the drive abnormality of the second wheel based on the second drive related information are executed in a cycle longer than the control cycle. By determining the presence or absence of the drive abnormality of the first and second wheels in the cycle longer than the control cycle for the drive controls of the first and second wheels in this way, loads on the communication and computation of each piece of information relating to the determination of the presence or absence of the drive abnormality can be reduced.

Then, it may be configured that the presence or absence of the drive abnormality of the first wheel is determined based on an average value of a plurality of pieces of the first drive related information received by the first drive related information reception unit; and the presence or absence of the drive abnormality of the second wheel is determined based on an average value of a plurality of pieces of the second drive related information received by the second drive related information reception unit. By determining the presence or absence of the drive abnormality of each wheel based on the average value of the plurality of pieces of the drive related information in this way, even if noise is added, for example, to part of the drive related information, the influence of such noise can be reduced and the presence or absence of the drive abnormality can be more properly determined.

For example, the communication of the first drive related information between the first drive related information transmission unit and the first drive related information reception unit and the communication of the second drive related information between the second drive related information transmission unit and the second drive related information reception unit may be carried out via a serial bus.

BRIEF DESCRIPTION OF DRAWINGS

FIG. 10 is a flow chart showing the drive control of each wheel in the second embodiment.

FIG. 11 is a flow chart showing the abnormality determination of each wheel in the second embodiment.

FIG. 12 is a flow chart showing the abnormality determination of each wheel in the third embodiment.

DETAILED DESCRIPTION

First Embodiment

Figure 1:
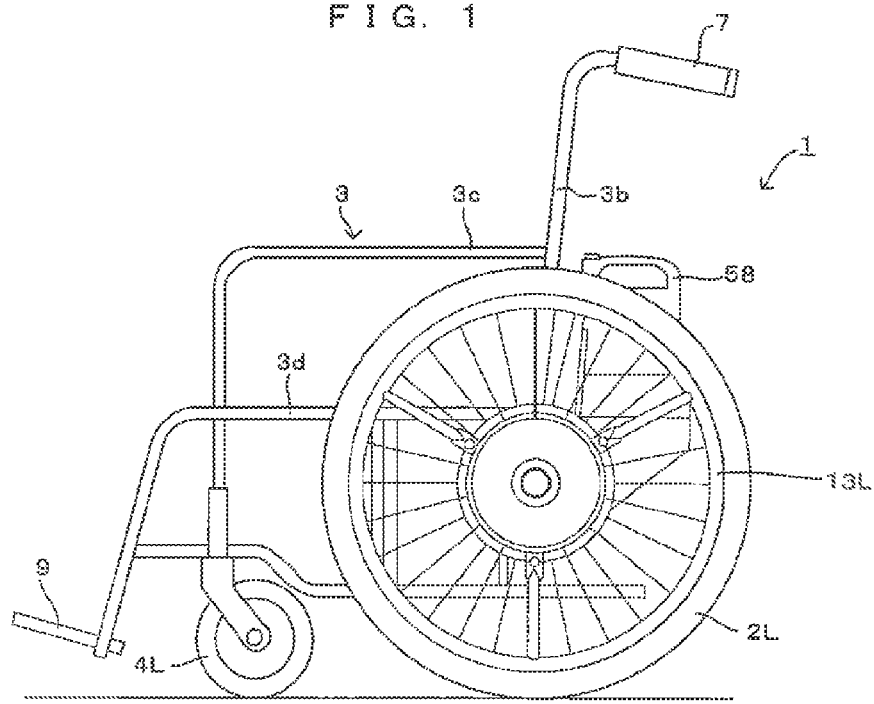
FIG. 1 is a side view showing an example of an electric wheelchair according to the disclosure.
Figure 2:
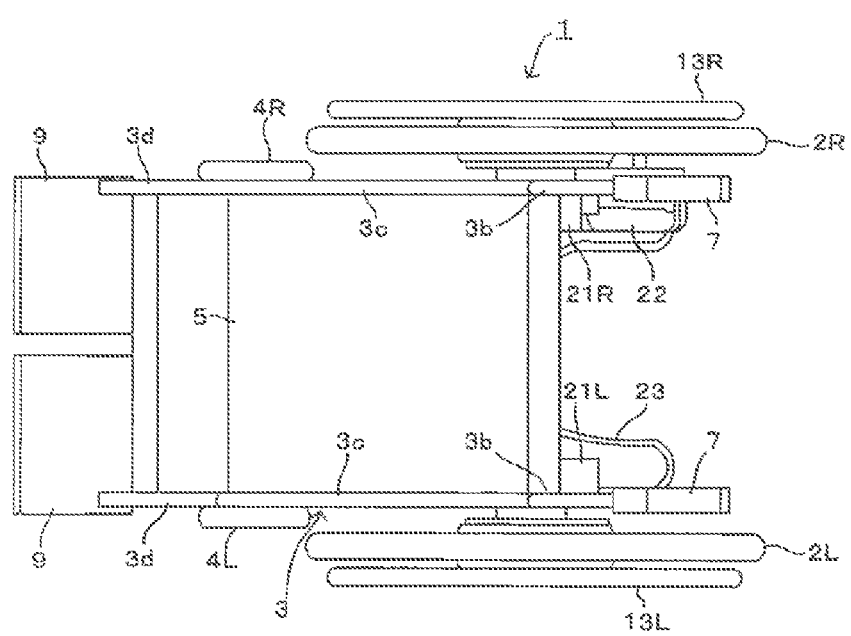
FIG. 2 is a plan view of the electric wheelchair of FIG. 1.
Figure 3:
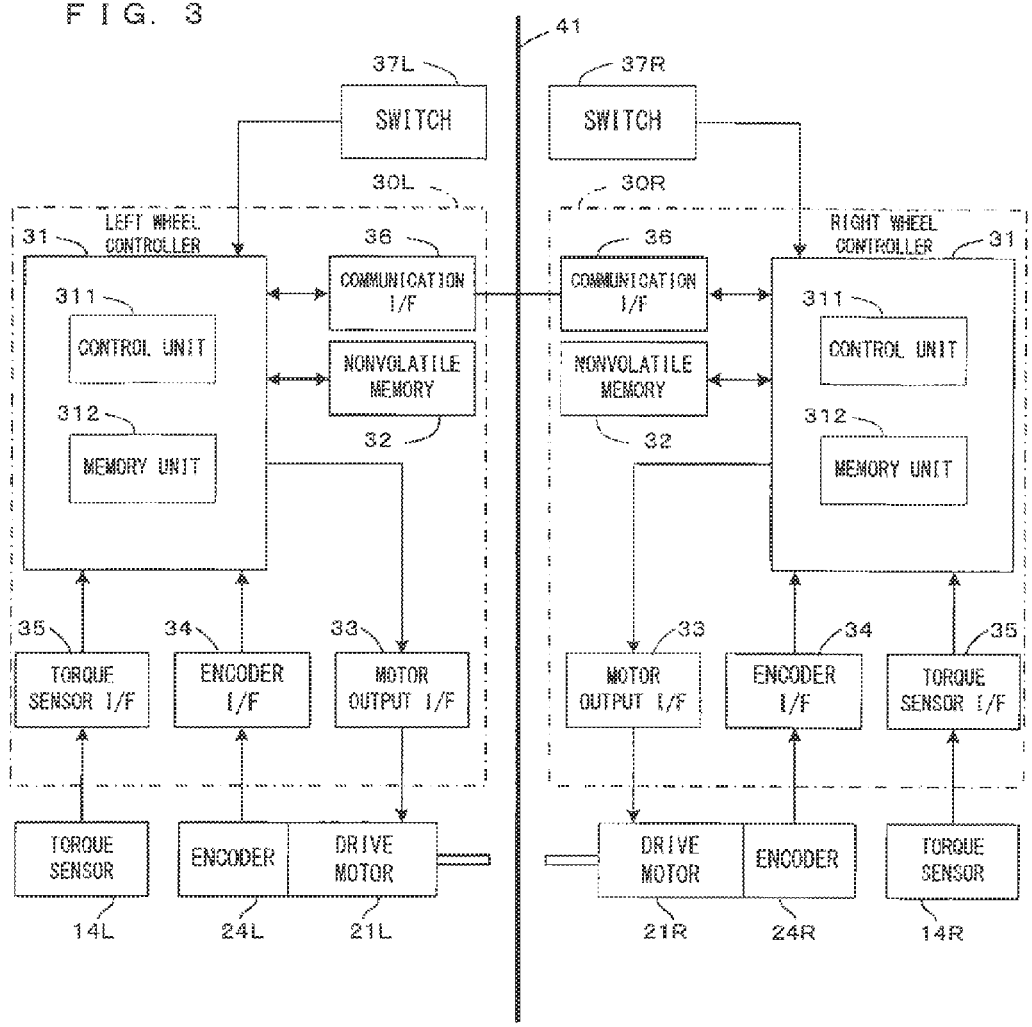
FIG. 3 is a block diagram showing an electrical configuration of the electric wheelchair in the first embodiment.

FIG. 1 is a side view showing an example of an electric wheelchair according to the disclosure. FIG. 2 is a plan view of the electric wheelchair of FIG. 1. FIG. 3 is a block diagram showing an electrical configuration of the electric wheelchair in the first embodiment. The electric wheelchair 1 according to the first embodiment applies auxiliary power corresponding to an operation to wheels when a passenger operates wheels. The electric wheelchair 1 includes a pair of left and right wheels 2L, 2R, a frame 3 in the form of a pipe frame and a pair of left and right casters 4L, 4R.

A seat 5 made of fabric (FIG. 2) is stretched in a central part of the frame 3 and the passenger can be seated on this seat 5. This frame 3 includes a plurality of arms. Out of those, a pair of left and right handle arms 3b stand in a rear part of the frame 3. An upper end part of each handle arm 3b is bent backwardly and a grip 7 for a caretaker is attached to that bent part.

An arm 3c extends horizontally forward of the wheelchair from an intermediate height position of each hand arm 3b. Front end parts of a pair of left and right arms 3 provided in this way are bent substantially at a right angle and extend vertically downward. The casters 4L, 4R are respectively freely rotatably supported on lower end parts of the left and right arms 3c.

A pair of left and right arms 3d are arranged below the left and right arms 3c. A front part of each arm 3d extends obliquely downward toward a front side of the wheelchair, and a step 9 is attached to each extending end (front end part). In this way, a pair of left and right steps 9 are provided and function as foot rests for a passenger.

The wheels 2L, 2R are respectively detachably attached to left and right parts of the frame 3 behind the casters 4L, 4R and freely movably support the frame 3 in cooperation with the casters 4L, 4R. Although not shown, each wheel 2L, 2R is freely rotatably supported on an axle supported on boss parts welded to the frame 3 via ball bearings. Note that the wheel 2L is written as the left wheel 2L and the wheel 2R is written as the right wheel 2R as appropriate in the following description.

A ring-shaped left hand rim 13L is provided at an outer side of the left wheel 2L to enable the manual operation of the left wheel 2L by the passenger. Further, a torque sensor 14L (FIG. 3) to detect a torque applied to the left wheel 2L by the passenger operating the left hand rim 13L is provided and a signal corresponding to a torque value is output to a left wheel controller 30L (FIG. 3) to control the left wheel 2L. On the other hand, a drive motor 21L to apply auxiliary power to the left wheel 2L and the left wheel controller 30L are provided at an inner side of the left wheel 2L. The left wheel controller 30L controls the drive motor 21L to adjust the auxiliary power to be applied to the left wheel 2L.

Further, as for the left wheel 2L, a right hand rim 13R is also provided at an outer side of the right wheel 2R to enable the manual operation of the right wheel 2R by the passenger and a drive motor 21R and a right wheel controller 30R (FIG. 3) are provided at an inner side to enable an adjustment of auxiliary power to the right wheel 2R. Further, when the passenger manually operates the right hand rim 13R, a torque applied to the right wheel 2R is detected by a torque sensor 14R (FIG. 3) and a signal corresponding to that detection value is output to the right wheel controller 30R. Note that since structures for mounting the hand rims and the drive motors on the wheels are described in detail, for example, in JP09-215713 A, the above structures are not described here.

A battery 22 is mounted on the electric wheelchair 1 to supply power to the drive motors 21L, 21R and the controllers 30L, 30R. In this embodiment, the battery 22 is detachably mounted at a position near the right wheel 2R and directly supplies power to the drive motor 21R and the right wheel controller 30R. Further, a wire harness 23 is laid from the side of the right wheel 2R to the side of the left wheel 2L on a vehicle body (frame) 3 and the battery 22 supplies power to the drive motor 21L and the left wheel controller 30L via the wire harness 23.

Next, the configurations of the left wheel controller 30L and the right wheel controller 30R are described with reference to FIG. 3. Since the left wheel controller 30L and the right wheel controller 30R are similarly configured, only the left wheel controller 30L is described here with the description of the right wheel controller 30R omitted.

The left wheel controller 30L includes a microcomputer 31, a nonvolatile memory 32, a motor output I/F 33, an encoder I/F 34, a torque sensor I/F 35 and a communication I/F 36 for communication with the right wheel controller 30R and can be turned on and off by a switch 37L. The microcomputer 31 includes a control unit 311 composed of a CPU or the like and a memory unit 312 composed of a RAM or the like, and calculates a current value to be applied to the drive motor 21L based on a force (torque) applied to the left hand rim 13L by the passenger and a rotation speed of the left wheel 2L and drives the drive motor 21L at this current value.

More specifically, a torque applied to the left hand rim 13L by the passenger is calculated by the input of a detection signal by the torque sensor 14L to the microcomputer 31 via the torque sensor I/F 35. Further, the rotation speed of the left wheel 2L is calculated by the input of a detection signal by an encoder 24L mounted on the drive motor 21L to the microcomputer 31 via the encoder I/F 34. The thus calculated torque and rotation speed are temporarily stored in the memory unit 312. Then, the control unit 311 calculates the current value to be applied to the drive motor 21L based on the torque and the rotation speed stored in the memory unit 312 and a predetermined program, data and the like stored in the nonvolatile memory 32 in accordance with a calculating formula included in the above program, and a signal relating to this current value is output to the drive motor 21L via the motor output I/F 33. Note that the current value calculated by the control unit 311 is also temporarily stored in the memory unit 312.

As just described, in this embodiment, the control unit 311 of the left wheel controller 30L utilizes the torque applied to the left hand rim 13L and the rotation speed of the left wheel 2L as input information related to a drive control of the left wheel 2L. Then, the control unit 311 calculates the current value to be applied to the drive motor 21L, as output information for controlling the drive motor 21L, based on the input information. A control similar to such a drive control of the left wheel 2L by the left wheel controller 30L is executed for the right wheel 2R by the right wheel controller 30R.

Here, each of the left wheel controller 30L and the right wheel controller 30R is provided with the communication I/F 36 and the aforementioned input information and output information can be transmitted to and received from each other between the left wheel controller 30L and the right wheel controller 30R by connecting each communication I/F 36 to a CAN bus 41 as one type of a serial bus. The left wheel controller 30L monitors the presence or absence of a drive abnormality on the right wheel 2R and the right wheel controller 30R monitors the presence or absence of a drive abnormality on the left wheel 2L based on the input information and the output information transmitted to and received from each other.

First Example of Drive Controls and Abnormality Determinations

Figure 4:
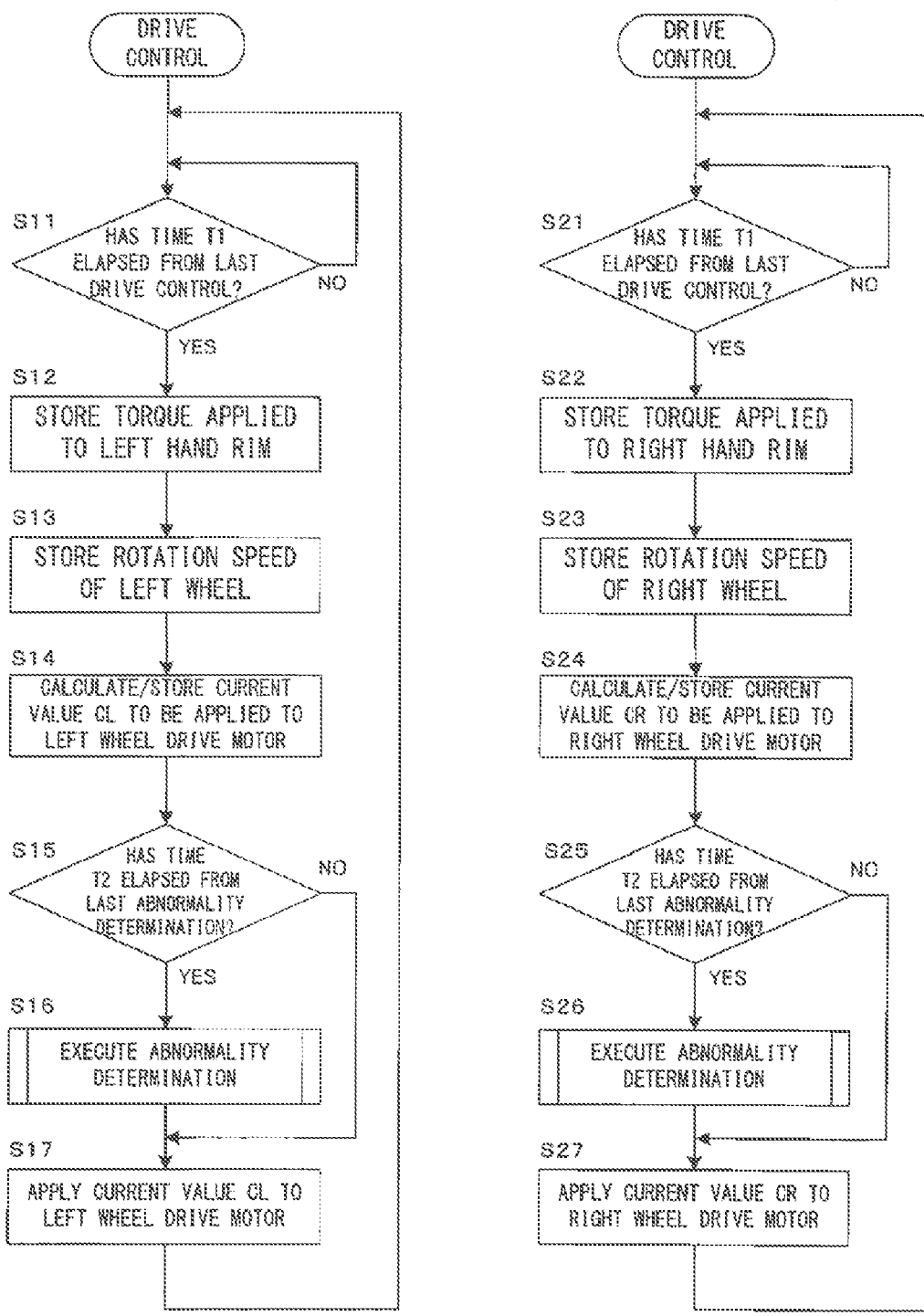
FIG. 4 is a flow chart showing the first example of the drive control of each wheel.
Figure 5:
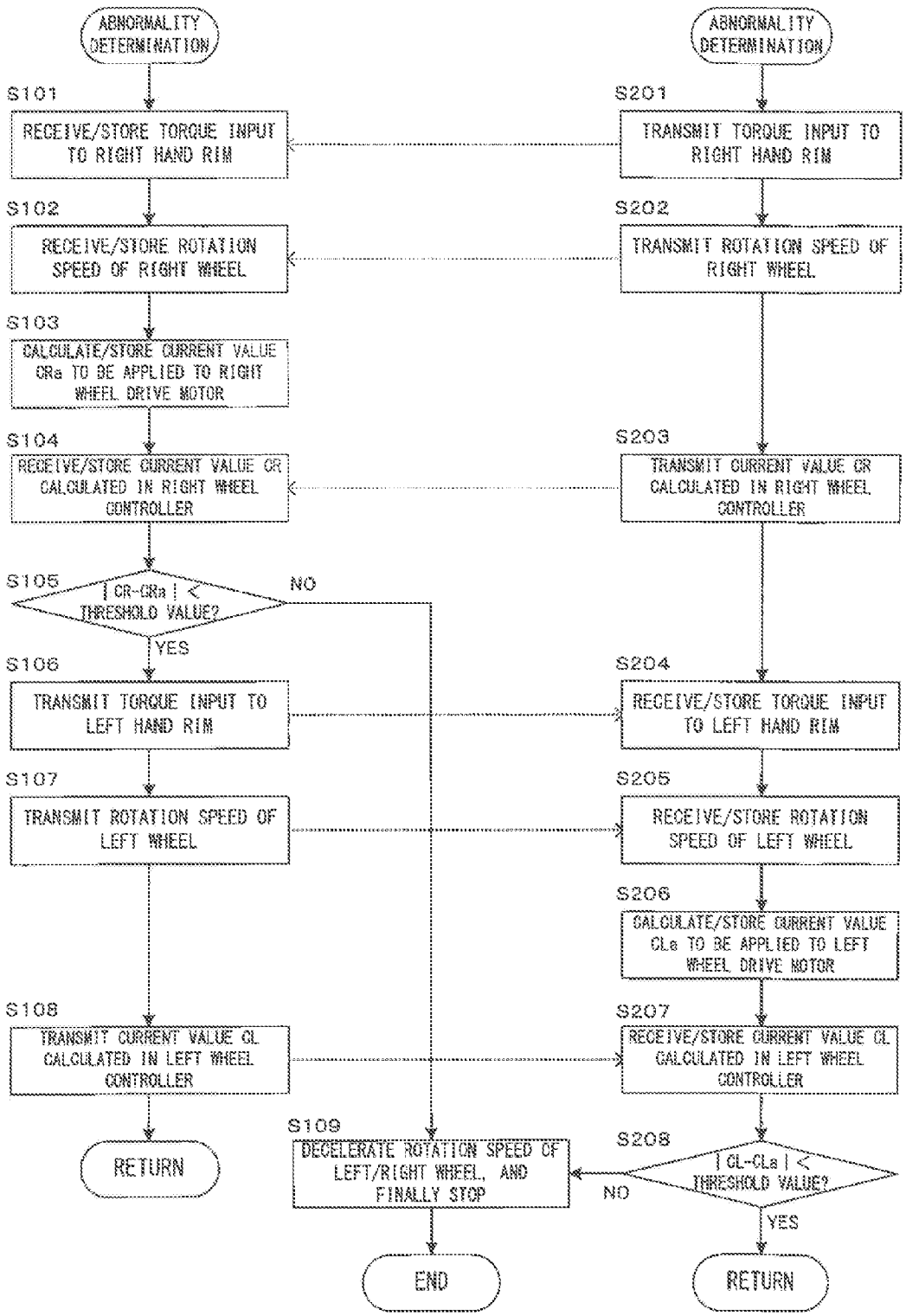
FIG. 5 is a flow chart showing the first example of the abnormality determination of each wheel.

Next, a first example of the drive control and determination of the presence or absence of a drive abnormality (hereinafter, referred to as "abnormality determination") of each wheel 2L, 2R executed by each controller 30L, 30R is described. FIG. 4 is a flow chart showing the first example of the drive control of each wheel and FIG. 5 is a flow chart showing the first example of the abnormality determination of each wheel. Since the drive controls executed by the left wheel controller 30L and the right wheel controller 30R are basically similar as shown in FIG. 4, only the drive control of the left wheel 2L by the left wheel controller 30L is described with the description of the drive control of the right wheel 2R by the right wheel controller 30R omitted here. Note that, in this embodiment, the drive controls are executed at the same timings in the same cycle T1 and the abnormality determinations are executed at the same timings in the same cycle T2 in the left wheel controller 30L and the right wheel controller 30L although described in detail later.

First, the control unit 311 of the left wheel controller 30L judges whether or not a time T1, which is an execution cycle of the drive control, has elapsed from the last drive control (Step S11). If the time T1 has elapsed, the control unit 311 calculates a torque applied to the left hand rim 13L by the passenger based on a signal input from the torque sensor I/F 35 and stores this torque in the memory unit 312 (Step S12). Subsequently, the control unit 311 calculates the rotation speed of the left wheel 2L based on a signal input from the encoder I/F 34 and stores this rotation speed in the memory unit 312 (Step S13). Then, a current value CL to be applied to the left wheel drive motor 21L is calculated based on the torque and the rotation speed stored in the memory unit 312 and the predetermined program, the data and the like stored in the nonvolatile memory 32, and this current value CL is stored in the memory unit 312 (Step S14).

Subsequently, it is judged whether or not a time T2, which is an execution cycle of the abnormality determination, has elapsed from the last abnormality determination (Step S15). The abnormality determination here indicates determination of the presence or absence of the drive abnormality of the right wheel 2R by the left wheel controller 30L. Although described in detail later, the execution cycle T2 of the abnormality determination is set longer than the execution cycle T1 of the drive control and an execution frequency of the abnormality determination is lower than an execution frequency of the drive control. If the time T2 has elapsed form the last abnormality determination, the abnormality determination is executed (Step S16). On the other hand, if the time T2 has not elapsed from the last abnormality determination, the left wheel 2L is driven by applying the current value CL calculated in Step S14 to the left wheel drive motor 21L without executing the abnormality determination (Step S17). Thereafter, a return is made to Step S11 and Steps S11 to S17 are repeated.

The drive control executed in the left wheel controller 30L in this way is similarly executed also in the right wheel controller 30R (Steps S21 to S27). As a result, when executing the abnormality determination in Steps S16, S26, the torque applied to the left hand rim 13L and the rotation speed of the left wheel 2L are stored as the input information related to the drive control of the left wheel 2L and the current value CL to be applied to the left wheel drive motor 21L is stored as the output information for controlling the left wheel drive motor 21L in the memory unit 312 of the left wheel controller 30L. Similarly, the torque applied to the right hand rim 13R and the rotation speed of the right wheel 2R are stored as the input information related to the drive control of the right wheel 2R and a current value CR to be applied to the right wheel drive motor 21R is stored as the output information for controlling the right wheel drive motor 21R in the memory unit 312 of the right wheel controller 30R. The abnormality determination by each controller 30L, 30R is executed by receiving and transmitting the input information and the output information stored in each memory unit 312 to and from the left and right controllers 30L, 30R via each communication I/F 36 and the CAN bus 41.

Next, the flow of the abnormality determination by each controller 30L, 30R is described with reference to FIG. 5. In this embodiment, after the abnormality determination of the right wheel 2R by the left wheel controller 30L is first executed, the abnormality determination of the left wheel 2L by the right wheel controller 30R is subsequently executed. To execute the abnormality determination of the right wheel 2R by the left wheel controller 30L, the torque input to the right hand rim 13R is transmitted from the communication I/F 36 of the right wheel controller 30R (Step S201) and this transmitted torque is received by the communication I/F 36 of the left wheel controller 30L by way of the CAN bus 41 and stored in the memory unit 312 (Step S101). Subsequently, the rotation speed of the right wheel 2R is transmitted from the communication I/F 36 of the right wheel controller 30R (Step S202) and this transmitted rotation speed is received by the communication I/F 36 of the left wheel controller 30L by way of the CAN bus 41 and stored in the memory unit 312 (Step S102).

When the left wheel controller 30L receives the torque input to the right hand rim 13R and the rotation speed of the right wheel 2R, the control unit 311 of the left wheel controller 30L calculates a current value CRa to be applied to the right wheel drive motor 21R using these as the input information and that result is stored in the memory unit 312 (Step S103). In calculating this current value CRa, the calculating formula used in calculating the current value CL for the left wheel 2L is used. Of course, a calculating formula for the current value CRa may be separately prepared and used. Thereafter, the current value CR already calculated based on the above input information in Step S24 of FIG. 4 by the control unit 311 of the right wheel controller 30R is transmitted from the communication I/F 36 of the right wheel controller 30R (Step S203). Then, the current value CR transmitted from the right wheel controller 30R is received by the communication I/F 36 of the left wheel controller 30L via the CAN bus 41 and stored in the memory unit 312 (Step S104).

Subsequently, the control unit 311 of the left wheel controller 30L judges whether or not an absolute value of a difference between the current value CR calculated in the right wheel controller 30R and the current value CRa calculated in the left wheel controller 30L is smaller than a predetermined threshold value (Step S105). If the absolute value of this difference is not smaller than the threshold value, there is thought to have been an abnormality in the current value CR calculated in the right wheel controller 30R. Thus, the left wheel controller 30L sends that result to the right wheel controller 30R. Then, the right wheel controller 30R having received this result decelerates the rotation speed of the right wheel 2R and finally stops the right wheel 2R by controlling the current value to be applied to the right wheel drive motor 21R. Along with this, the left wheel controller 30L also decelerates the rotation speed of the left wheel 2L and finally stops the left wheel 2L by controlling the current value to be applied to the left wheel drive motor 21L (Step S109).

As just described, each wheel 2L, 2R is decelerated and the electric wheelchair 1 is finally stopped if it is judged that there is an abnormality in the current value CR calculated in the right wheel controller 30R and the drive abnormality occurs in the right wheel 2R.

If the absolute value of the difference between the current values CR and CRa is smaller than the predetermined threshold value in Step S105, the abnormality determination of the left wheel 2L by the right wheel controller 30R is subsequently executed. First, the torque input to the left hand rim 13L is transmitted from the communication I/F 36 of the left wheel controller 30L (Step S106) and this transmitted torque is received by the communication I/F 36 of the right wheel controller 30R by way of the CAN bus 41 and stored in the memory unit 312 (Step S204). Subsequently, the rotation speed of the left wheel 2L is transmitted from the communication I/F 36 of the left wheel controller 30L (Step S107) and this transmitted rotation speed is received by the communication I/F 36 of the right wheel controller 30L by way of the CAN bus 41 and stored in the memory unit 312 (Step S205).

When the right wheel controller 30R receives the torque input to the left hand rim 13L and the rotation speed of the left wheel 2L, the control unit 311 of the right wheel controller 30R calculates a current value CLa to be applied to the left wheel drive motor 21L using these as the input information and that result is stored in the memory unit 312 (Step S206). In calculating this current value CLa, the calculating formula used in calculating the current value CR for the right wheel 2R is used. Of course, a calculating formula for the current value CLa may be separately prepared and used. Thereafter, the current value CL already calculated based on the above input information in Step 14 of FIG. 4 by the control unit 311 of the left wheel controller 30L is transmitted from the communication I/F 36 of the left wheel controller 30L (Step S108). Then, the current value CL transmitted from the left wheel controller 30L is received by the communication I/F 36 of the right wheel controller 30R via the CAN bus 41 and stored in the memory unit 312 (Step S207).

Subsequently, the control unit 311 of the right wheel controller 30R judges whether or not an absolute value of a difference between the current value CL calculated in the left wheel controller 30L and the current value CLa calculated in the right wheel controller 30R is smaller than a predetermined threshold value (Step S208). If the absolute value of this difference is not smaller than the threshold value, there is thought to have been an abnormality in the current value CL calculated in the left wheel controller 30L. Thus, the right wheel controller 30R sends that result to the left wheel controller 30L. Then, the left wheel controller 30L having received this result decelerates the rotation speed of the left wheel 2L and finally stops the left wheel 2L by controlling the current value to be applied to the left wheel drive motor 21L. Along with this, the right wheel controller 30R also decelerates the rotation speed of the right wheel 2R and finally stops the right wheel 2R by controlling the current value to be applied to the right wheel drive motor 21R (Step S109).

As just described, each wheel 2L, 2R is decelerated and the electric wheelchair 1 is finally stopped if it is judged that there is an abnormality in the current value CL calculated in the left wheel controller 30L and the drive abnormality occurs in the left wheel 2L.

If the absolute value of the difference between the current values CL and CLa is smaller than the threshold value in Step S208, no abnormality is determined in both the abnormality determination of the right wheel 2R by the left wheel controller 30L in Step S105 and abnormality determination of the left wheel 2L by the right wheel controller 30R in Step S208. Thus, the control units 311 respectively finish the abnormality determinations and return to Steps S17, S27 of FIG. 4 to apply the current value CL to the left wheel drive motor 21L and apply the current value CR to the right wheel drive motor 21R.

According to the first example of the abnormality determination of each wheel 2L, 2R described above, in the abnormality determination of the right wheel 2R by the left wheel controller 30L, the output information (current value CR) is calculated based on the input information (torque input to the right hand rim 13R and rotation speed of the right wheel 2R) in the control unit 311 of the right wheel controller 30R and the output information (current value CRa) is estimated based on the above input information in the control unit 311 of the left wheel controller 30L. Since the presence or absence of the drive abnormality of the right wheel 2R is determined based on the current values CR, CRa obtained in the control units 311 of the respective right wheel controller 30R and left wheel controller 30L, the drive abnormality that possibly occurs in the right wheel 2R can be detected such as in the case where the right wheel controller 30R malfunctioned and the current value CR could not be properly calculated.

Similarly, in the abnormality determination of the left wheel 3L by the right wheel controller 30R, the output information (current value CL) is calculated based on the input information (torque input to the left hand rim 13L and rotation speed of the left wheel 2L) in the control unit 311 of the left wheel controller 30L and the output information (current value CLa) is estimated based on the above input information in the control unit 311 of the right wheel controller 30R. Since the presence or absence of the drive abnormality of the left wheel 2L is determined based on the current values CL, CLa obtained in the control units 311 of the respective left wheel controller 30L and right wheel controller 30R, the drive abnormality that possibly occurs in the left wheel 2L can be detected such as in the case where the left wheel controller 30L malfunctioned and the current value CL could not be properly calculated.

Figure 6:
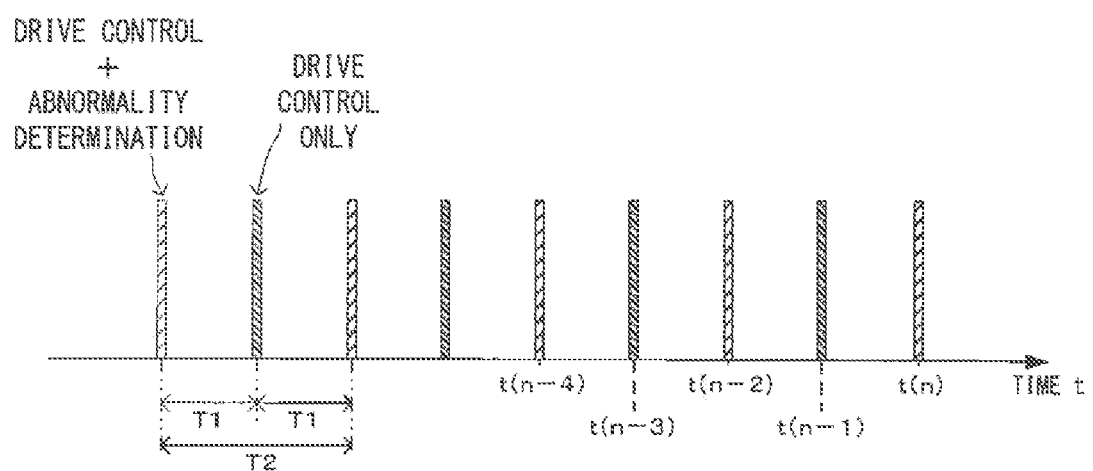
FIG. 6 is a chart schematically showing execution timings of the drive control and the abnormality determination of each wheel.

Here, timings at which the drive control and the abnormality determination of each wheel 2L, 2R are executed in each controller 30L, 30R are described in detail. FIG. 6 is a chart schematically showing execution timings of the drive control and the abnormality determination of each wheel. In this embodiment, the drive controls of the respective wheels 2L, 2R are executed at the same timing in every control cycle T1. On the other hand, the abnormality determinations of the respective wheels 2L, 2R are executed at the same timing in every cycle T2 which is a time twice as long as the control cycle T1. Further, the abnormality determination of each wheel 2L, 2R executed in every cycle T2 is executed at the same timing as the drive control. Specifically, the drive control executed in every control cycle T1 is repeated alternately in the case associated with the execution of the abnormality determination and in the case not associated with the execution of the abnormality determination. As just described, loads on the communications and computations of each piece of information relating to the determination of the presence or absence of the drive abnormality can be reduced by determining the presence or absence of the drive abnormality of each wheel 2L, 2R in the cycle T2 longer than the control cycle T1 for executing the drive control of each wheel 2L, 2R.

In executing the abnormality determination, the presence or absence of an abnormality is determined based on whether or not the absolute value of the difference between the current value calculated in the right wheel controller 30R and the current value calculated in the left wheel controller 30L is smaller than the predetermined threshold value (see Steps S105, S208 of FIG. 5). This determination may be made based on a plurality of current values. This is specifically described below with reference to FIG. 6.

Here, time intervals of times t(n−4), t(n−3), t(n−2), t(n−1) and t(n) shown in FIG. 6 are T1 and the drive control of each wheel 2L, 2R is executed at each of these times. On the other hand, the abnormality determination is executed together with the drive control of each wheel 2L, 2R at times t(n−4), t(n−2) and t(n) having a time interval of T2 out of these times. At this time, in the case of executing the abnormality determination of the right wheel 2R by the left wheel controller 30L, for example, at time t(n), the current values CRa calculated in the last and last but one abnormality determinations executed at times t(n−4), t(n−2) may be considered in addition to the current value CRa calculated by the left wheel controller 30L in the abnormality determination executed at time t(n) and the abnormality determination may be executed using an average value of these three current values CRa.

In this case, for the current value CR calculated by the right wheel controller 30R, an average value of three current values CR calculated by the right wheel controller 30R in the drive controls executed at times t(n−4), t(n−2) and t(n) may be obtained and an absolute value of a difference from the average value of the current values CRa described above may be compared with a threshold value. The abnormality determination of the left wheel 2L by the right wheel controller 30R may be similarly executed based on an average value of a plurality of current values. By executing the determination of the presence or absence of the drive abnormality of each wheel 2L, 2R based on the average value of the plurality of current values in this way, the presence or absence of the drive abnormality can be more properly determined by reducing the influence of noise, for example, even if the noise is added to some of the current values. Note that the abnormality determination using an average value of a plurality values in this way can be also applied in each of the embodiments described below.

Second Example of Drive Controls and Abnormality Determinations

Figure 7:
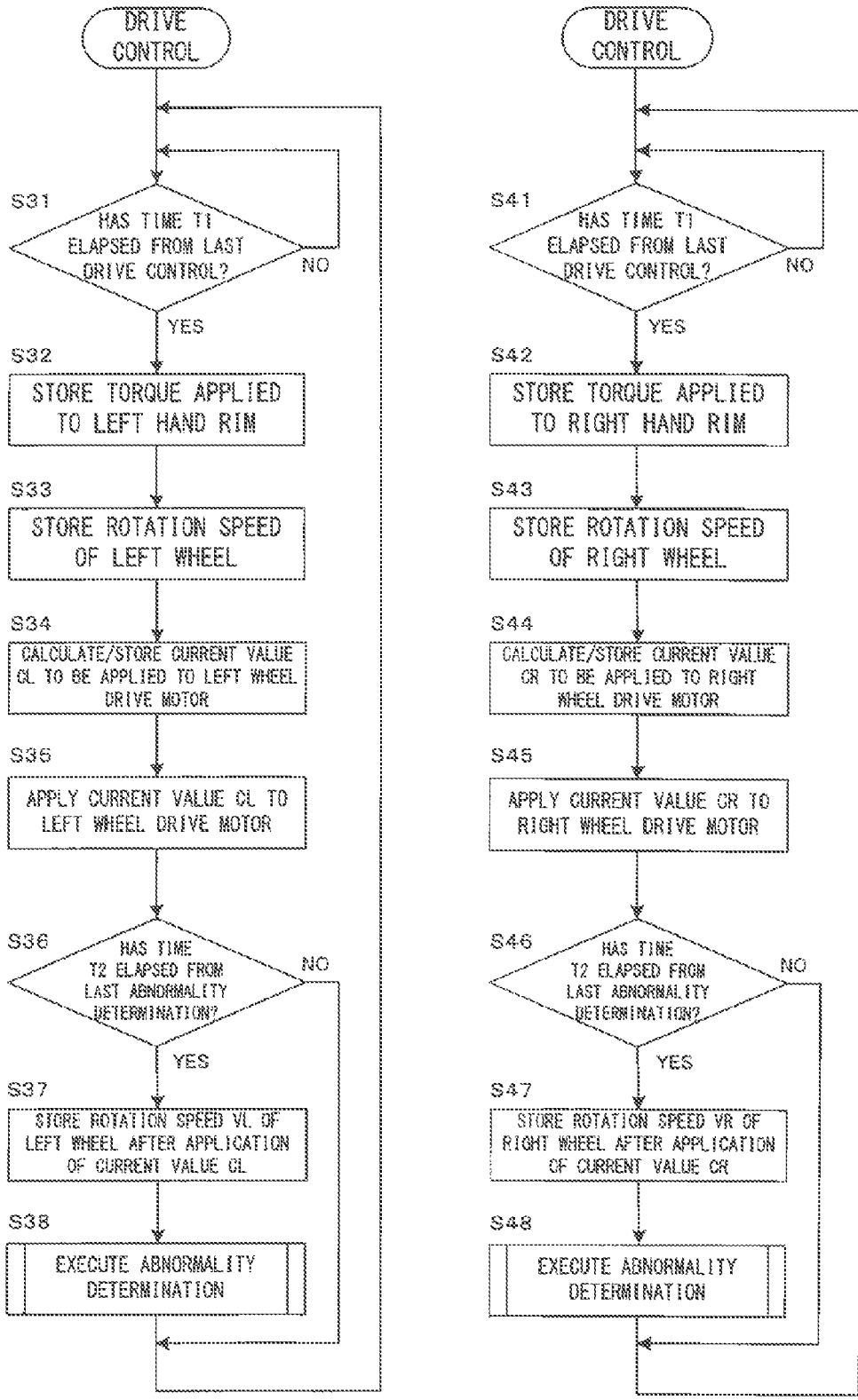
FIG. 7 is a flow chart showing the second example of the drive control of each wheel.
Figure 8:
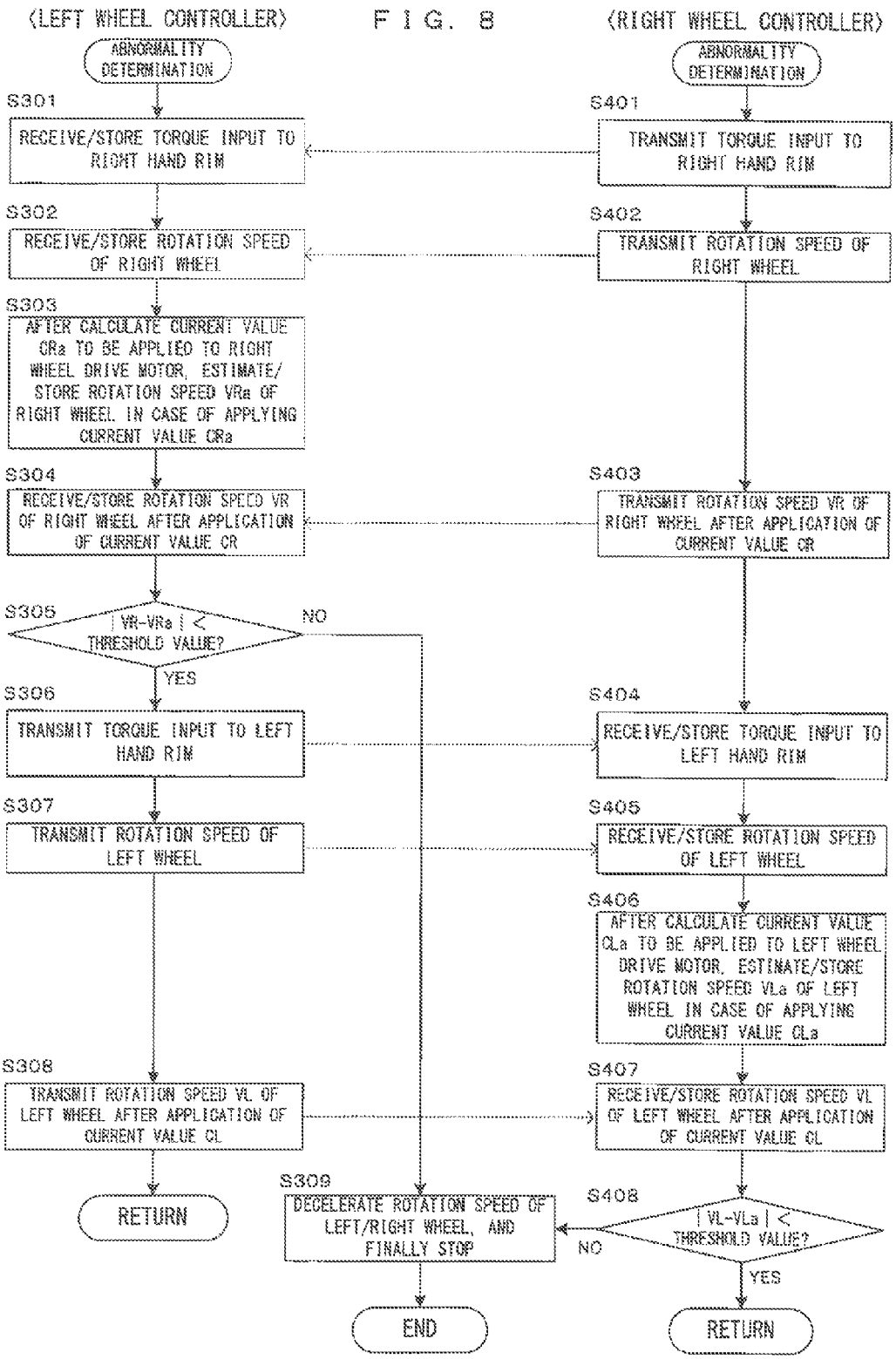
FIG. 8 is a flow chart showing the second example of the abnormality determination of each wheel.

Next, a second example of the drive control and the abnormality determination of each wheel 2L, 2R executed in each controller 30L, 30R is described. FIG. 7 is a flow chart showing the second example of the drive control of each wheel and FIG. 8 is a flow chart showing the second example of the abnormality determination of each wheel. Since the drive controls executed by the left wheel controller 30L and the right wheel controller 30R are basically similar as shown in FIG. 8, only the drive control of the left wheel 2L by the left wheel controller 30L is described with the description of the drive control of the right wheel 2R by the right wheel controller 30R omitted here.

Steps S31 to S34 in the second embodiment of the drive control are similar to Steps S11 to S14 of the first example (FIG. 4). Specifically, the second example is similar to the first example up to the calculation of the current value CL to be applied to the left wheel drive motor 21L based on the torque applied to the left hand rim 13L and the rotation speed of the left wheel 2L. However, the second example differs from the first example thereafter in that the abnormality determination is executed before the current value CL is applied in the first example, whereas the abnormality determination is executed after the current value CL is applied in the second example. That is, in the second example of the drive control, when the current value CL to be applied to the left wheel drive motor 21L is calculated in Step S34, this current value CL is applied to the left wheel drive motor 21L in following Step S35.

Subsequently, it is judged whether or not the time T2, which is an execution cycle of the abnormality determination, has elapsed from the last abnormality determination (Step S36). If the time T2 has elapsed from the last abnormality determination, a rotation speed VL of the left wheel 2L after the application of the current value CL to the left wheel drive motor 21L is calculated based on a signal input from the encoder I/F 34 and this rotation speed VL is stored in the memory unit 312 (Step S37). At this time, the rotation speed VL of the left wheel 2L to be detected is preferably a value when the rotation speed is stabilized according to the current value CL such as when a predetermined time elapses from the application of the current value CL to the left wheel drive motor 21L and the rotation speed of the left wheel 2L becomes constant or a change rate of the rotation speed of the left wheel 2L is within a predetermined range. After the rotation speed VL is stored, the abnormality determination of the right wheel 2R by the left wheel controller 30L is subsequently executed (Step S38). On the other hand, if the time T2 has not elapsed from the last abnormality determination, a return is made to Step S31 without executing the abnormality determination and Steps S31 to S37 are repeated.

The drive control executed in the left wheel controller 30L in this way is also executed in the right wheel controller 30R (Steps S41 to S48). As a result, in the memory unit 312 of the left wheel controller 30L, the torque applied to the left hand rim 13L and the rotation speed of the left wheel 2L are stored as the input information related to the drive control of the left wheel 2L and the rotation speed VL of the left wheel 2L after the application of the current value CL to the left wheel drive motor 21L is stored. Similarly, in the memory unit 312 of the right wheel controller 30R, the torque applied to the right hand rim 13R and the rotation speed of the right wheel 2R are stored as the input information related to the drive control of the right wheel 2R and a rotation speed VR of the right wheel 2R after the application of the current value CR to the right wheel drive motor 21R is stored. The abnormality determination by each controller 30L 30R is executed by transmitting and receiving the input information and the rotation speeds VL, VR after the application of the current values CL, CR stored in each memory unit 312 to and from the left and right controllers 30L, 30R via each communication I/F 36 an the CAN bus 41.

Next, the flow of the abnormality determination by each controller 30L, 30R is described with reference to FIG. 8. In this embodiment, after the abnormality determination of the right wheel 2R by the left wheel controller 30L is first executed, the abnormality determination of the left wheel 2L by the right wheel controller 30R is then executed. To execute the abnormality determination of the right wheel 2R by the left wheel controller 30L, the torque input to the right hand rim 13R is transmitted from the communication I/F 36 of the right wheel controller 30R (Step S401) and this transmitted torque is received by the communication I/F 36 of the left wheel controller 30L by way of the CAN bus 41 and stored in the memory unit 312 (Step S301). Subsequently, the rotation speed of the right wheel 2R (stored in Step S43 of FIG. 7 before the current value CR is applied) is transmitted from the communication I/F 36 of the right wheel controller 30R (Step S402) and this transmitted rotation speed is received by the communication I/F 36 of the left wheel controller 30L by way of the CAN bus 41 and stored in the memory unit 312 (Step S302).

When the left wheel controller 30L receives the torque input to the right hand rim 13R and the rotation speed of the right wheel 2R, the control unit 311 of the left wheel controller 30L calculates the current value CRa to be applied to the right wheel drive motor 21R using these as the input information and estimates a rotation speed VRa of the right wheel 2R in the case of applying the current value CRa and those results are stored in the memory unit 312 (Step S303). Note that the calculating formula used in calculating the current value CL for the left wheel 2L is used for the current value CRa, whereas the rotation speed VRa is calculated in accordance with a calculating formula for rotation speed incorporated into the program beforehand. Thereafter, the rotation speed VR of the right wheel 2R stored in the memory unit 312 of the right wheel controller 30R in Step S47 of FIG. 7 is transmitted from the communication I/F 36 of the right wheel controller 30R (Step S403). Then, the rotation speed VR transmitted from the right wheel controller 30R is received by the communication I/F 36 of the left wheel controller 30L via the CAN bus 41 and stored in the memory unit 312 (Step S304).

Subsequently, the control unit 311 of the left wheel controller 30L judges whether or not an absolute value of a difference between the actual rotation speed VR of the right wheel 2R transmitted from the right wheel controller 30R and the rotation speed VRa of the right wheel 2R estimated in the left wheel controller 30L is smaller than a predetermined threshold value (Step S305). If the absolute value of this difference is not smaller than the threshold value, there is thought to be an abnormality in the rotation speed VR of the right wheel 2R. Thus, the left wheel controller 30L sends that result to the right wheel controller 30R. Then, the right wheel controller 30R having received this result decelerates the rotation speed of the right wheel 2R and finally stops the right wheel 2R by controlling the current value to be applied to the right wheel drive motor 21R. Along with this, the left wheel controller 30L also decelerates the rotation speed of the left wheel 2L and finally stops the left wheel 2L by controlling the current value to be applied to the left wheel drive motor 21L (Step S309).

As just described, each wheel 2L, 2R is decelerated and the electric wheelchair 1 is finally stopped if it is judged that there is an abnormality in the actual rotation speed VR of the right wheel 2R after the application of the current value VR to the right wheel drive motor 21R and the drive abnormality has occurred in the right wheel 2R.

If the absolute value of the difference between the current values VR and VRa is smaller than the threshold value, the abnormality determination of the left wheel 2L by the right wheel controller 30R is subsequently executed. First, the torque input to the left hand rim 13L is transmitted from the communication I/F 36 of the left wheel controller 30L (Step S306) and this transmitted torque is received by the communication I/F 36 of the right wheel controller 30R by way of the CAN bus 41 and stored in the memory unit 312 (Step S404). Subsequently, the rotation speed of the left wheel 2L (stored in Step S33 of FIG. 7 before the application of the current value CL) is transmitted from the communication I/F 36 of the left wheel controller 30L (Step S307) and this transmitted rotation speed is received by the communication I/F 36 of the right wheel controller 30R by way of the CAN bus 41 and stored in the memory unit 312 (Step S405).

When the right wheel controller 30R receives the torque input to the left hand rim 13L and the rotation speed of the left wheel 2L, the control unit 311 of the right wheel controller 30R calculates the current value CLa to be applied to the left wheel drive motor 21L using these as the input information and estimates a rotation speed VLa of the left wheel 2L in the case of applying this current value CLa and those results are stored in the memory unit 312 (Step S406). Note that the calculating formula used in calculating the current value CR for the right wheel 2R is used for the current value CLa, whereas the rotation speed VLa is calculated in accordance with a calculating formula for rotation speed incorporated into the program beforehand. Thereafter, the rotation speed VL of the left wheel 2L stored in the memory unit 312 of the left wheel controller 30L in Step S37 of FIG. 7 is transmitted from the communication I/F 36 of the left wheel controller 30L (Step S308). Then, the rotation speed VL transmitted from the left wheel controller 30L is received by the communication I/F 36 of the right wheel controller 30R via the CAN bus 41 and stored in the memory unit 312 (Step S407).

Subsequently, the control unit 311 of the right wheel controller 30R judges whether or not an absolute value of a difference between the actual rotation speed VL of the left wheel 2L transmitted from the left wheel controller 30L and the rotation speed VLa of the left wheel 2L estimated in the right wheel controller 30R is smaller than a predetermined threshold value (Step S408). If the absolute value of this difference is not smaller than the threshold value, there is thought to be an abnormality in the rotation speed VL of the left wheel 2L. Thus, the right wheel controller 30R sends that result to the left wheel controller 30L. Then, the left wheel controller 30L having received this result decelerates the rotation speed of the left wheel 2L and finally stops the left wheel 2L by controlling the current value to be applied to the left wheel drive motor 21L. Along with this, the right wheel controller 30R also decelerates the rotation speed of the right wheel 2R and finally stops the right wheel 2R by controlling the current value to be applied to the right wheel drive motor 21R (Step S309).

As just described, each wheel 2L, 2L is decelerated and the electric wheelchair 1 is finally stopped if it is judged that there is an abnormality in the actual rotation speed VL of the left wheel 2L after the application of the current value VL to the left wheel drive motor 21L and the drive abnormality has occurred in the left wheel 2L.

If the absolute value of the difference between the rotation speeds VL and VLa is smaller than the threshold value in Step S408, no abnormality is determined in both the abnormality determination of the right wheel 2R by the left wheel controller 30L in Step S305 and the abnormality determination of the left wheel 2L by the right wheel controller 30R in Step S408 and the abnormality determination of each wheel 2L, 2R is finished.

According to the second example of the abnormality determination of each wheel 2L, 2R described above, in the abnormality determination of the right wheel 2R by the left wheel controller 30L, the actual rotation speed VR of the right wheel 2R when the right wheel 2R is driven using the output information (current value CR) calculated based on the input information (torque input to the right hand rim 13R and rotation speed of the right wheel 2R) in the control unit 311 of the right wheel controller 30R and the rotation speed VRa of the right wheel 2R estimated when the right wheel 2R is driven using the output information (current value CRa) calculated based on the input information in the control unit 311 of the left wheel controller 30L are obtained. Then, the presence or absence of the drive abnormality of the right wheel 2R is determined based on the actual rotation speed VR of the right wheel 2R and the estimated rotation speed VRa of the right wheel 2R. Thus, an abnormality can be detected when the rotation speed of the right wheel 2R does not reach the rotation speed corresponding to the current value CR from the control unit 311 of the right wheel controller 30R, for example, due to an obstacle, unevenness or the like present on a road and a drive abnormality has occurred in the right wheel 2R.

Similarly, in the abnormality determination of the left wheel 3L by the right wheel controller 30R, the actual rotation speed VL of the left wheel 2L when the left wheel 2L is driven using the output information (current value CL) calculated based on the input information (torque input to the left hand rim 13L and rotation speed of the left wheel 2L) in the control unit 311 of the left wheel controller 30L and the rotation speed VLa of the left wheel 2L estimated when the left wheel 2L is driven using the output information (current value CLa) calculated based on the input information in the control unit 311 of the right wheel controller 30R are obtained. Then, the presence or absence of the drive abnormality of the right wheel 2R is determined based on the actual rotation speed VL of the left wheel 2L and the estimated rotation speed VLa of the left wheel 2L. Thus, an abnormality can be detected when the rotation speed of the left wheel 2L does not reach the rotation speed corresponding to the current value CL from the control unit 311 of the left wheel controller 30L, for example, due to an obstacle, unevenness or the like present on a road and a drive abnormality has occurred in the left wheel 2L.

Further, in both first and second examples of this embodiment, the control unit 311 of the left wheel controller 30L and the control unit 311 of the right wheel controller 30R determine the presence or absence of the drive abnormality of the opposite wheels 2R, 2L. Thus, it is not necessary to separately provide a control unit for determining the presence or absence of the drive abnormality of each wheel 2L, 2R and the driven state of each wheel 2L, 2R can be monitored by a simple device configuration.

Second Embodiment

A second embodiment of the disclosure is described. In the first embodiment, the current value to be applied to each drive motor 21L, 21R is calculated in each controller 30L, 30R based on the torque input to each hand rim 13L, 13R by the passenger and each wheel 2L, 2R is driven by applying this current value to each drive motor 21L, 21R. On the other hand, an electric wheelchair of the second embodiment is so configured that each wheel is driven by a passenger operating a joystick or a caretaker operating a button. The second embodiment is described below, centering on points of difference from the configuration of the first embodiment.

Figure 9:
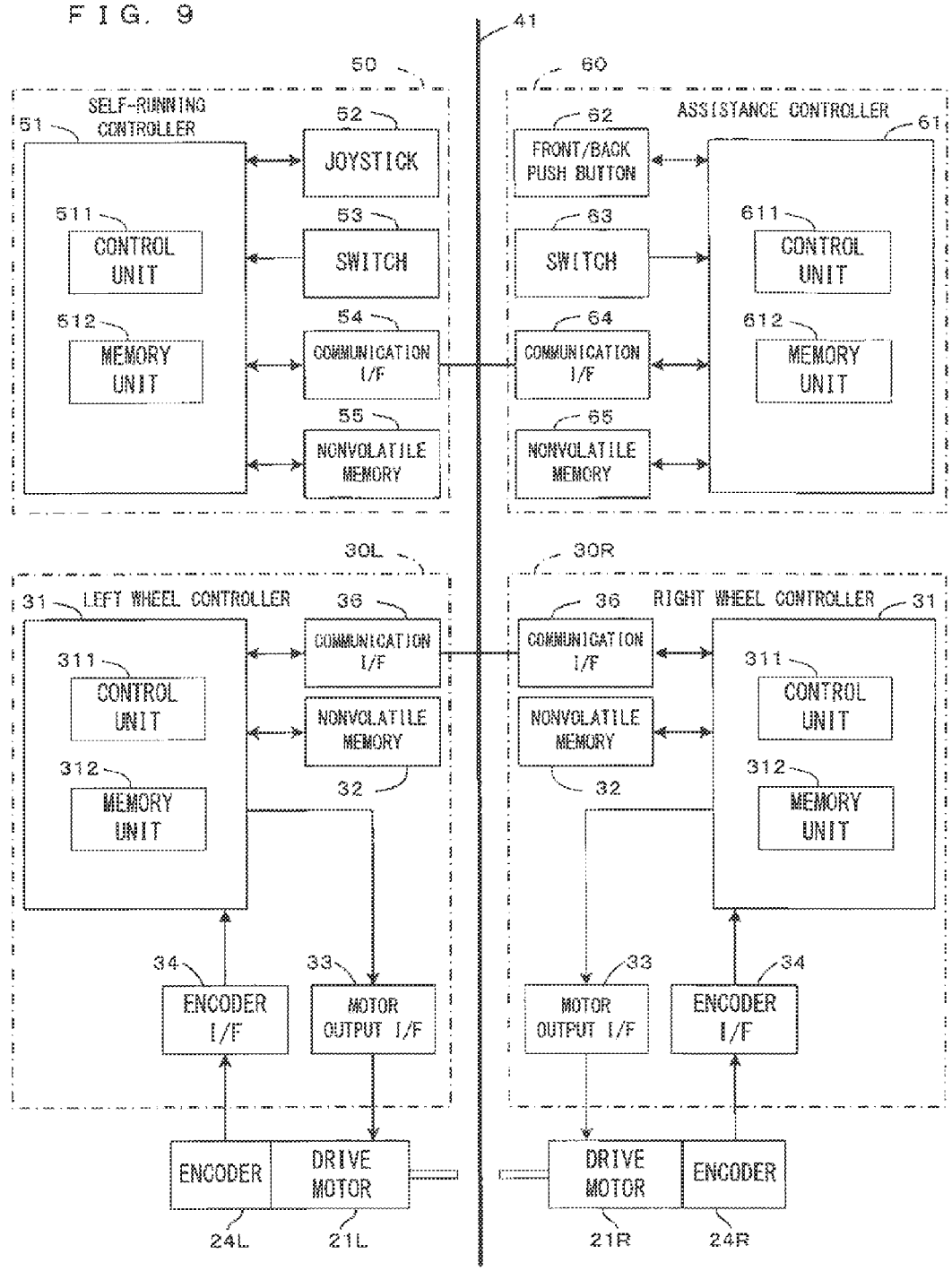
FIG. 9 is a block diagram showing an electrical configuration of the electric wheelchair in the second embodiment.

FIG. 9 is a block diagram showing an electrical configuration of the electric wheelchair in the second embodiment. The electric wheelchair 1 in the second embodiment further includes a self-running controller 50 and an assistance controller 60 in addition to a left wheel controller 30L and a right wheel controller 30R. The self-running controller 50 includes a joystick 52. When a passenger operates the joystick 52, rotation commands for wheels 2L, 2R corresponding to that operation (running command) are transmitted to the left wheel controller 30L and the right wheel controller 30R.

More specifically, the self-running controller 50 includes a microcomputer 51, the joystick 52, a switch 53, a communication I/F 54 for communication with the other controllers 30L, 30R and 60, and a nonvolatile memory 55 and can be turned on and off by the switch 53. The microcomputer 51 includes a control unit 511 composed of a CPU or the like and a memory unit 512 composed of a RAM or the like. The control unit 511 performs various computations based on rotation commands for the respective wheels 2L, 2R corresponding to the operation of the joystick 52 by the passenger, each signal received via the communication I/F 54 and various programs, data and the like stored in the nonvolatile memory 55.

Further, the assistance controller 60 includes a front/back push button 62. When the caretaker operates the front/back push button 62, rotation commands for the respective wheels 2L, 2R corresponding to that operation (running command) are transmitted to the left wheel controller 30L and the right wheel controller 30R. More specifically, the assistance controller 60 includes a microcomputer 61, the front/back push button 62, a switch 63, a communication I/F 64 for communication with the other controllers 30L, 30R and 50 and a nonvolatile memory 65 and can be turned on and off by the switch 63. The microcomputer 61 includes a control unit 611 composed of a CPU or the like and a memory unit 612 composed of a RAM or the like. The control unit 611 performs various computations based on rotation commands for the respective wheel 2L, 2R corresponding to the operation of the front/back push button 62 by the caretaker, each signal received via the communication I/F 64 and various programs, data and the like stored in the nonvolatile memory 65.

Although the torque applied to each hand rim 13L, 13R and the rotation speed of each wheel 2L, 2R are utilized as the input information related to the drive control of the left wheel 2L in the first embodiment, the rotation commands corresponding to the operation of the joystick 52 (or front/back push button 62) and the rotation speed of each wheel 2L, 2R are utilized in the second embodiment. A current value to be applied to each drive motor 21L, 21R is calculated based on these pieces of the input information in the control unit 311 of each controller 30L, 30R and this current value is output to each drive motor 21L, 21R as output information for controlling each drive motor 21L, 21R.

Next, the flows of the drive control and the abnormality determination of each wheel 2L, 2R in the second embodiment are described. FIG. 10 is a flow chart showing the drive control of each wheel in the second embodiment and FIG. 11 is a flow chart showing the abnormality determination of each wheel in the second embodiment. The drive control in the second embodiment is basically similar to the drive control in the first example of the first embodiment shown in FIG. 4. Both drive controls differ in that the torque input to each hand rim 13L, 13R is treated as one piece of the input information in the drive control in the first example of the first embodiment, whereas the rotation commands corresponding to the operation of the joystick 52 by the passenger are treated as one piece of the input information in the second embodiment. Note that it is also possible to treat the rotation commands corresponding to the operation of the front/back push button 62 by the caretaker as the input information instead of the rotation commands corresponding to the operation of the joystick 52 by the passenger.

As shown in FIG. 10, at the time of executing the drive controls, the rotation commands for the respective wheels 2L, 2R corresponding to the operation of the joystick 52 by the passenger are stored in the memory unit 512 (Step S71) and, thereafter, these rotation commands are transmitted from the communication I/F 54 of the self-running controller 50 (Step S72). The transmitted rotation commands are received by the respective communication I/Fs 36 of the left wheel controller 30L and the right wheel controller 30R via the CAN bus 41 and stored in the memory units 312 (Steps S52, S62). When the left wheel controller 30L calculates a current value CL to be applied to the left wheel drive motor 21L in Step S54, the rotation command corresponding to the operation of the joystick 52 and the rotation speed of the left wheel 2L are utilized as the input information. Similarly, when the right wheel controller 30R calculates a current value CR to be applied to the right wheel drive motor 21R in Step S64, the rotation command corresponding to the operation of the joystick 52 and the rotation speed of the right wheel 2R are utilized as the input information. Other Steps are not described since they are the same as in the drive controls shown in FIG. 4.

Further, as shown in FIG. 11, the abnormality determinations in the second embodiment are also basically similar to the abnormality determinations in the first example of the first embodiment shown in FIG. 5, but differ in that the torque input to each hand rim 13L, 13R is treated as one piece of the input information in the abnormality determination in the first example of the first embodiment, whereas the rotation commands corresponding to the operation of the joystick 52 by the passenger are treated as one piece of the input information in the second embodiment. Further, in the second embodiment, the rotation commands corresponding to the operation of the joystick 52 are already stored in the respective memory units 312 of the left wheel controller 30L and the right wheel controller 30R in Steps S52, S62 of the drive control shown in FIG. 10. Thus, Steps in which the left wheel controller 30L and the right wheel controller 30R receive and store the rotation commands at the time of executing the abnormality determinations (Steps equivalent to Steps S101, S204 of FIG. 5) are omitted. Except for the above points, the abnormality determinations in the second embodiment are similar to the abnormality determinations in the first example of the first embodiment and the presence or absence of the drive abnormality of the right wheel 2R is judged by the left wheel controller 30L and the presence or absence of the drive abnormality of the left wheel 2L is judged by the right wheel controller 30R.

Third Embodiment

Next, a third embodiment of the disclosure is described. The third embodiment is basically similar to the second embodiment in the electrical configuration of the electric wheelchair and the drive controls, but differs therefrom in that the abnormality determinations are executed not by the left wheel controller 30L and the right wheel controller 30R, but by the self-running controller 50. Accordingly, the abnormality determinations in the third embodiment are described below with reference to FIG. 12. FIG. 12 is a flow chart showing the abnormality determination of each wheel in the third embodiment. In this embodiment, after the abnormality determination of the left wheel 2L is executed by the self-running controller 50, the abnormality determination of the right wheel 2R is similarly executed by the self-running controller 50.

First, the rotation speed of the left wheel 2L is transmitted from the communication I/F 36 of the left wheel controller 30L (Step S701) and this transmitted rotation speed is received by the communication I/F 54 of the self-running controller 50 by way of the CAN bus 41 and stored in the memory unit 512 (Step S901). Then, the control unit 511 of the self-running controller 50 calculates a current value CLa to be applied to the left wheel drive motor 21L as output information using the rotation command corresponding to the operation of the joystick 52 and the rotation speed of the left wheel 2L stored in the memory unit 512 as input information, and stores the current value CLa in the memory unit 512 (Step S902). Note that the current value CLa is calculated in accordance with a calculating formula incorporated into a program. Subsequently, the current value CL calculated by the left wheel controller 30L in Step S54 of FIG. 10 is transmitted from the communication I/F 36 of the left wheel controller 30L (Step S702) and this transmitted current value CL is received by the communication I/F 54 of the self-running controller 50 by way of the CAN bus 41 and stored in the memory unit 512 (Step S903).

Subsequently, the control unit 511 of the self-running controller 50 judges whether or not an absolute value of a difference between the current value CL calculated in the left wheel controller 30L and the current value CLa calculated in the self-running controller 50 is smaller than a predetermined threshold value (Step S904). If the absolute value of this difference is not smaller than the threshold value, there is thought to have been an abnormality in the current value CL calculated in the left wheel controller 30L. Thus, in this case, the self-running controller 50 sends that result to each of the left wheel controller 30L and the right wheel controller 30R. Then, the respective control units 311 of the left wheel controller 30L and the right wheel controller 30R having received this result decelerate the rotation speeds of the left wheel 2L and the right wheel 2R and finally stops these wheels (Step S909).

As just described, each wheel 2L, 2R is decelerated and the electric wheelchair 1 is finally stopped if it is judged that there is an abnormality in the current value CL calculated in the left wheel controller 30L and the drive abnormality occurs in the left wheel 2L.

If the absolute value of the difference between the current values CL and CLa is smaller than the threshold value, the abnormality determination of the right wheel 2R by the self-running controller 50 is subsequently executed. First, the rotation speed of the right wheel 2R is transmitted from the communication I/F 36 of the right wheel controller 30R (Step S801) and this transmitted rotation speed is received by the communication I/F 54 of the self-running controller 50 by way of the CAN bus 41 and stored in the memory unit 512 (Step S905). Then, the control unit 511 of the self-running controller 50 calculates a current value CRa to be applied to the right wheel drive motor 21R as output information using the rotation command corresponding to the operation of the joystick 52 and the rotation speed of the right wheel 2R stored in the memory unit 512 as input information, and stored the current value CRa in the memory unit 512 (Step S906). Note that the current value CRa is calculated in accordance with a calculating formula incorporated into a program. Subsequently, the current value CR calculated by the right wheel controller 30R in Step S64 of FIG. 10 is transmitted from the communication I/F 36 of the right wheel controller 30R (Step S802) and this transmitted current value CR is received by the communication I/F 54 of the self-running controller 50 by way of the CAN bus 41 and stored in the memory unit 512 (Step S907).

Subsequently, the control unit 511 of the self-running controller 50 judges whether or not an absolute value of a difference between the current value CR calculated in the right wheel controller 30R and the current value CRa calculated in the self-running controller 50 is smaller than a predetermined threshold value (Step S908). If the absolute value of this difference is not smaller than the threshold value, there is thought to have been an abnormality in the current value CR calculated in the right wheel controller 30R. Thus, in this case, the self-running controller 50 sends that result to each of the left wheel controller 30L and the right wheel controller 30R. Then, the respective control units 311 of the left wheel controller 30L and the right wheel controller 30R having received this result decelerate the rotation speeds of the left wheels 2L and right wheel 2R and finally stops these wheels (Step S909). On the other hand, if the absolute value of the difference between the current values CR and CRa is smaller than the threshold value, the abnormality determinations are finished.

As just described, each wheel 2L, 2R is decelerated and the electric wheelchair 1 is finally stopped if it is judged that there is an abnormality in the current value CR calculated in the right wheel controller 30R and the drive abnormality occurs in the right wheel 2R.

By determining the presence or absence of the drive abnormality of each wheel 2L, 2R by the self-running controller 50 provided separately from the left wheel controller 30L and the right wheel controller 30R as in this embodiment, the drive abnormality of each wheel 2L, 2R can be more reliably detected even if both the left wheel controller 30L and the right wheel controller 30R malfunction.

As described above, in the first embodiment and second embodiment, the abnormality determination of the right wheel 2R is executed by the left wheel controller 30L and abnormality determination of the left wheel 2L is executed by the right wheel controller 30R. Further, in the third embodiment, the abnormality determinations of the left wheel 2L and the right wheel 2R are executed by the self-running controller 50. By executing the abnormality determination of the left wheel 2L by the right wheel controller 30R or the self-running controller 50 other than the left wheel controller 30L to execute the drive control of the left wheel 2L in this way, the presence or absence of the drive abnormality of the left wheel 2L can be objectively determined. Similarly, by executing the abnormality determination of the right wheel 2R by the left wheel controller 30L or the self-running controller 50 other than the right wheel controller 30R to execute the drive control of the right wheel 2R in this way, the presence or absence of the drive abnormality of the right wheel 2R can be objectively determined. Thus, the driven state of each wheel 2L, 2R can be properly monitored.

Here, in each of the above embodiments, the wheels 2L, 2R respectively correspond to examples of a "first wheel" and a "second wheel" of the disclosure, the drive motors 21L, 21R respectively correspond to examples of a "first driving unit" and a "second driving unit" of the disclosure, the control unit 311 of the left wheel controller 30L corresponds to an example of a "first control unit" of the disclosure, the control unit 311 of the right wheel controller 30R corresponds to an example of a "second control unit" of the disclosure, the torque input to the left hand rim 13L (or rotation command corresponding to the operation of the joystick 52 or the front/back push button 62) and the rotation speed of the left wheel 2L correspond to an example of "first input information" of the disclosure, the current value CL calculated in the control unit 311 of the left wheel controller 30L corresponds to "first output information" of the disclosure, the torque input to the right hand rim 13R (or rotation command corresponding to the operation of the joystick 52 or the front/back push button 62) and the rotation speed of the right wheel 2R correspond to an example of "second input information" of the disclosure, the current value CR calculated in the control unit 311 of the right wheel controller 30R corresponds to "second output information" of the disclosure, and the CAN bus 41 corresponds to an example of a "serial bus" of the disclosure.

Further, in the first example of the first embodiment, the communication I/F 36 of the left wheel controller 30L functions as a "first drive related information transmission unit" and a "second drive related information reception unit" of the disclosure, the communication I/F 36 of the right wheel controller 30R functions as a "second drive related information transmission unit" and a "first drive related information reception unit" of the disclosure, the control unit 311 of the left wheel controller 30L functions as a "second output information estimation unit" and a "second wheel abnormality determination unit" of the disclosure, and the control unit 311 of the right wheel controller 30R functions as a "first output information estimation unit" and a "first wheel abnormality determination unit" of the disclosure.

Further, in the first example of the first embodiment, the torque input to the left hand rim 13L, the rotation speed of the left wheel 2L and the current value CL calculated in the control unit 311 of the left wheel controller 30L correspond to an example of "first drive related information" of the disclosure, and the torque input to the right hand rim 13R, the rotation speed of the right wheel 2R and the current value CR calculated in the control unit 311 of the right wheel controller 30R correspond to an example of "second drive related information" of the disclosure.

Further, in the second example of the first embodiment, the communication I/F 36 of the left wheel controller 30L functions as the "first drive related information transmission unit" and the "second drive related information reception unit" of the disclosure, the communication I/F 36 of the right wheel controller 30R functions as the "second drive related information transmission unit" and the "first drive related information reception unit" of the disclosure, the control unit 311 of the left wheel controller 30L functions as a "second rotation speed estimation unit" and the "second wheel abnormality determination unit" of the disclosure, and the control unit 311 of the right wheel controller 30R functions as a "first rotation speed estimation unit" and the "first wheel abnormality determination unit" of the disclosure.

Further, in the second example of the first embodiment, the torque input to the left hand rim 13L, the rotation speed of the left wheel 2L and the rotation speed of the left wheel 2L when the current value CL calculated in the control unit 311 of the left wheel controller 30L is applied to the left wheel drive motor 21L correspond to an example of the "first drive related information" of the disclosure, and the torque input to the right hand rim 13R, the rotation speed of the right wheel 2R and the rotation speed of the right wheel 2R when the current value CR calculated in the control unit 311 of the right wheel controller 30R is applied to the right wheel drive motor 21R correspond to an example of the "second drive related information" of the disclosure.

Further, in the second embodiment, the joystick 52 (or front/back push button 62) corresponds to an example of an "operation unit" of the disclosure, the communication I/F 36 of the left wheel controller 30L functions as the "first drive related information transmission unit" and the "second drive related information reception unit" of the disclosure, the communication I/F 36 of the right wheel controller 30R functions as the "second drive related information transmission unit" and the "first drive related information reception unit" of the disclosure, the control unit 311 of the left wheel controller 30L functions as the "second output information estimation unit" and the "second wheel abnormality determination unit" of the disclosure, and the control unit 311 of the right wheel controller 30R functions as the "first output information estimation unit" and the "first wheel abnormality determination unit" of the disclosure.

Further, in the second embodiment, the rotation command corresponding to the operation of the joystick 52 (or front/back push button 62), the rotation speed of the left wheel 2L and the current value CL calculated in the control unit 311 of the left wheel controller 30L correspond to an example of the "first drive related information" of the disclosure, and the rotation command corresponding to the operation of the joystick 52 (or front/back push button 62), the rotation speed of the right wheel 2R and the current value CR calculated in the control unit 311 of the right wheel controller 30R correspond to an example of the "second drive related information" of the disclosure.

Further, in the third embodiment, the joystick 52 (or front/back push button 62) corresponds to an example of the "operation unit" of the disclosure, the communication I/F 36 of the left wheel controller 30L functions as the "first drive related information transmission unit" of the disclosure, the communication I/F 36 of the right wheel controller 30R functions as the "second drive related information transmission unit" of the disclosure, the communication I/F 54 of the self-running controller 50 functions as the "first drive related information reception unit" and the "second drive related information reception unit" of the disclosure, and the control unit 511 of the self-running controller 50 corresponds to an example of a "third control unit" of the disclosure.

Further, in the third embodiment, the rotation command corresponding to the operation of the joystick 52 (or front/back push button 62), the rotation speed of the left wheel 2L and the current value CL calculated in the control unit 311 of the left wheel controller 30L correspond to an example of the "first drive related information" of the disclosure, and the rotation command corresponding to the operation of the joystick 52 (or front/back push button 62), the rotation speed of the right wheel 2R and the current value CR calculated in the control unit 311 of the right wheel controller 30R correspond to an example of the "second drive related information" of the disclosure.

Miscellaneous

Note that the disclosure is not limited to the above respective embodiments and various changes can be made on the aforementioned embodiments without departing from the gist of the disclosure. For example, although the determination method (determination method based on the current values) similar to the abnormality determinations in the first example of the first embodiment is adopted in the second and third embodiments, the determination method (determination method based on the rotation speeds of the wheels) similar to the abnormality determinations in the second example of the first embodiment may be adopted. Further, which physical quantities are adopted as the first and second input information, the first and second output information and the first and second drive related information can be appropriately changed.

Further, although the abnormality determination of each wheel 2L, 2R is executed by comparing the absolute value of the difference between the current values CL and CLa (or difference between the current values CR and CRa) and the predetermined threshold value or by comparing the absolute value of the rotation speeds VL and VLa (or difference between the rotation speeds VR and VRa) and the predetermined threshold value in each of the above embodiments, a technique of the abnormality determination is not limited to this and can be appropriately changed. For example, a map for determining the presence or absence of the drive abnormality of each wheel according to each physical quantity may be prepared in the controller to execute the abnormality determination and the abnormality determination may be executed based on this map.

Further, although the left wheel 2L and the right wheel 2R are stopped after being decelerated if it is judged that the drive abnormality has occurred in the left wheel 2L or the right wheel 2R in each of the above embodiments, this case can be handled in another way. For example, if it is judged that the drive abnormality has occurred, the abnormality may be notified to the user (passenger or caretaker) by means of a buzzer, a lamp or the like provided on the electric wheelchair 1 in addition to or instead of the stop of the left wheel 2L and the right wheel 2R.

Further, although the drive controls and the abnormality determinations are executed in the same cycles and at the same timings in the left wheel controller 30L and the right wheel controller 30R in the first and second embodiments, the cycles and the timings for the execution of the drive controls and the abnormality determinations can be also made different between the left wheel controller 30L and the right wheel controller 30R.

Further, in the first example of the first embodiment, each current value CL, CR is applied to each drive motor 21L, 21R if no abnormality is determined after the execution of the abnormality determination. However, the execution of the abnormality determination and the application of the current value CL, CR to each drive motor 21L, 21R may be simultaneously performed or the abnormality determination may be executed after the current value CL, CR is applied to each drive motor 21L, 21R.

Further, although the abnormality determination of the left wheel 2L by the right wheel controller 30R is successively executed after the execution of the abnormality determination of the right wheel 2R by the left wheel controller 30L in the first and second embodiments, an execution order of the abnormality determinations can be appropriately changed and the abnormality determinations by the respective controllers 30L, 30R need not necessarily be successively executed.

Further, although the abnormality determination of each wheel 2L, 2R by the self-running controller 50 is described in the third embodiment, the abnormality determination of each wheel 2L, 2R may be executed by the assistance controller 60 in addition to or instead of by the self-running controller 50.

Further, although the CAN bus 41 is adopted as the serial bus for communication among the respective controllers in the above embodiments, a communication means can be appropriately changed. For example, wireless communication may be carried out among the respective controllers.

The invention claimed is:

1. A wheelchair electric device to cause a wheelchair to run by driving a first wheel by a first driving unit and driving a second wheel by a second driving unit, comprising:
   a first control unit to calculate first output information based on first input information related to a drive control of the first wheel and control the first driving unit by the first output information;
   a second control unit to calculate second output information based on second input information related to a drive control of the second wheel and control the second driving unit by the second output information;
   a first drive related information transmission unit to transmit at least part of the first input information and the first output information as first drive related information related to the drive of the first wheel;
   a second drive related information transmission unit to transmit at least part of the second input information and the second output information as second drive related information related to the drive of the second wheel;
   a first drive related information reception unit to receive the first drive related information transmitted from the first drive related information transmission unit; and
   a second drive related information reception unit to receive the second drive related information transmitted from the second drive related information transmission unit, wherein:
   the presence or absence of a drive abnormality of the first wheel is determined based on the first drive related information received by the first drive related information reception unit and the presence or absence of a drive abnormality of the second wheel is determined based on the second drive related information received by the second drive related information reception unit;
   the first control unit determines the presence or absence of the drive abnormality of the second wheel based on the second drive related information received by the second drive related information reception unit; and
   the second control unit determines the presence or absence of the drive abnormality of the first wheel based on the first drive related information received by the first drive related information reception unit.

2. The wheelchair electric device according to claim 1, wherein:
   the second drive related information transmission unit transmits the second input information and the second output information as the second drive related information; and
   the first control unit includes:
   a second output information estimation unit to estimate the second output information based on the second input information received by the second drive related information reception unit, and
   a second wheel abnormality determination unit to determine the presence or absence of the drive abnormality of the second wheel based on the second output information estimated by the second output information estimation unit and the second output information received by the second drive related information reception unit.

3. The wheelchair electric device according to claim 1, wherein:
   the first drive related information transmission unit transmits the first input information and the first output information as the first drive related information; and
   the second control unit includes:
   a first output information estimation unit to estimate the first output information based on the first input information received by the first drive related information reception unit, and
   a first wheel abnormality determination unit to determine the presence or absence of the drive abnormality of the first wheel based on the first output information estimated by the first output information estimation unit and the first output information received by the first drive related information reception unit.

4. The wheelchair electric device according to claim 1, wherein:

the second drive related information transmission unit transmits a rotation speed of the second wheel when the second wheel is driven by the second output information and the second input information as the second drive related information; and the first control unit includes:
- a second rotation speed estimation unit to calculate the second output information based on the second input information received by the second drive related information reception unit and estimate the rotation speed of the second wheel when the second wheel is driven by the calculated second output information, and
- a second wheel abnormality determination unit to determine the presence or absence of the drive abnormality of the second wheel based on the rotation speed of the second wheel estimated by the second rotation speed estimation unit and the rotation speed of the second wheel received by the second drive related information reception unit.

5. The wheelchair electric device according to claim 1, wherein:

the first drive related information transmission unit transmits a rotation speed of the first wheel when the first wheel is driven by the first output information and the first input information as the first drive related information; and the second control unit includes:
- a first rotation speed estimation unit to calculate the first output information based on the first input information received by the first drive related information reception unit and estimate the rotation speed of the first wheel when the first wheel is driven by the calculated first output information, and
- a first wheel abnormality determination unit to determine the presence or absence of the drive abnormality of the first wheel based on the rotation speed of the first wheel estimated by the first rotation speed estimation unit and the rotation speed of the first wheel received by the first drive related information reception unit.

6. The wheelchair electric device according to claim 1, wherein:

the communication of the first drive related information between the first drive related information transmission unit and the first drive related information reception unit and the communication of the second drive related information between the second drive related information transmission unit and the second drive related information reception unit are carried out via a serial bus.

7. An electric wheelchair that runs by driving the first wheel and the second wheel by the wheelchair electric device according to claim 1.

8. A wheelchair electric device to cause a wheelchair to run by driving a first wheel by a first driving unit and driving a second wheel by a second driving unit, comprising:

a first control unit to calculate first output information based on first input information related to a drive control of the first wheel and control the first driving unit by the first output information;

a second control unit to calculate second output information based on second input information related to a drive control of the second wheel and control the second driving unit by the second output information;

a first drive related information transmission unit to transmit at least part of the first input information and the first output information as first drive related information related to the drive of the first wheel;

a second drive related information transmission unit to transmit at least part of the second input information and the second output information as second drive related information related to the drive of the second wheel;

a first drive related information reception unit to receive the first drive related information transmitted from the first drive related information transmission unit;

a second drive related information reception unit to receive the second drive related information transmitted from the second drive related information transmission unit;

an operation unit to receive a running command by a user; and a third control unit to control the running of the wheelchair by outputting a rotation command of the first wheel as the first input information and outputting a rotation command of the second wheel as the second input information based on a command given to the operation unit, wherein:

the presence or absence of a drive abnormality of the first wheel is determined based on the first drive related information received by the first drive related information reception unit and the presence or absence of a drive abnormality of the second wheel is determined based on the second drive related information received by the second drive related information reception unit; and the third control unit determines the presence or absence of the drive abnormality of the first wheel based on the first drive related information received by the first drive related information reception unit and determines the presence or absence of the drive abnormality of the second wheel based on the second drive related information received by the second drive related information reception unit.

9. A wheelchair electric device to cause a wheelchair to run by driving a first wheel by a first driving unit and driving a second wheel by a second driving unit, comprising:

a first control unit to calculate first output information based on first input information related to a drive control of the first wheel and control the first driving unit by the first output information;

a second control unit to calculate second output information based on second input information related to a drive control of the second wheel and control the second driving unit by the second output information;

a first drive related information transmission unit to transmit at least part of the first input information and the first output information as first drive related information related to the drive of the first wheel;

a second drive related information transmission unit to transmit at least part of the second input information and the second output information as second drive related information related to the drive of the second wheel;

a first drive related information reception unit to receive the first drive related information transmitted from the first drive related information transmission unit; and a second drive related information reception unit to receive the second drive related information transmitted from the second drive related information transmission unit, wherein:

the presence or absence of a drive abnormality of the first wheel is determined based on the first drive related information received by the first drive related information reception unit and the presence or absence of a drive abnormality of the second wheel is determined based on the second drive related information received by the second drive related information reception unit; and the drive control of the first wheel by the first control unit and the drive control of the second wheel by the second control unit are executed in a same control cycle, whereas the transmission and reception of the first drive related information, the determination of the presence or absence of the drive abnormality of the first wheel based on the first drive related information, the transmission and reception of the second drive related information and the determination of the presence or absence of the drive abnormality of the second wheel based on the second drive related information are executed in a cycle longer than the control cycle.

10. The wheelchair electric device according to claim 9, wherein:

the presence or absence of the drive abnormality of the first wheel is determined based on an average value of a plurality of pieces of the first drive related information received by the first drive related information reception unit; and the presence or absence of the drive abnormality of the second wheel is determined based on an average value of a plurality of pieces of the second drive related information received by the second drive related information reception unit.

11. A drive monitoring method for an electric wheelchair that runs by driving a first wheel by a wheel chair electric device and driving a second wheel by the wheel chair electric device, comprising:

calculating first output information by a first control unit of the wheel chair electric device based on first input information related to a drive control of the first wheel;

calculating second output information by a second control unit of the wheel chair electric device based on second input information related to a drive control of the second wheel;

transmitting at least part of the first input information and the first output information as first drive related information related to the drive of the first wheel;

transmitting at least part of the second input information and the second output information as second drive related information related to the drive of the second wheel; and receiving the transmitted first drive related information and determining the presence or absence of a drive abnormality of the first wheel based on the first drive related information, and receiving the transmitted second drive related information and determining the presence or absence of a drive abnormality of the second wheel based on the second drive related information, wherein:

the presence or absence of the drive abnormality of the first wheel is determined by the second control unit based on the first drive related information; and the presence or absence of the drive abnormality of the second wheel is determined by the first control unit based on the second drive related information.

* * * * *